United States Patent
Saito et al.

(10) Patent No.: US 9,716,818 B2
(45) Date of Patent: Jul. 25, 2017

(54) ILLUMINATION APPARATUS HAVING FIRST CASE AND SECOND CASE ROTATABLE RELATIVE TO FIRST CASE, AND IMAGING APPARATUS HAVING DETACHABLE ILLUMINATION APPARATUS

(71) Applicant: CANON KABUSHIKI KAISHA, Tokyo (JP)

(72) Inventors: Keiichiro Saito, Tokyo (JP); Yutaka Yamamoto, Yokohama (JP); Toshiki Miyakawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/143,063

(22) Filed: Apr. 29, 2016

(65) Prior Publication Data

US 2016/0330356 A1 Nov. 10, 2016

(30) Foreign Application Priority Data

May 7, 2015 (JP) ................................ 2015-095237
May 7, 2015 (JP) ................................ 2015-095238
May 7, 2015 (JP) ................................ 2015-095239

(51) Int. Cl.
*H04N 5/225* (2006.01)

(52) U.S. Cl.
CPC ............................ *H04N 5/2256* (2013.01)

(58) Field of Classification Search
CPC .... H04N 5/2256; H04N 5/235; H04N 5/2357; H04N 1/6086
See application file for complete search history.

(56) References Cited

U.S. PATENT DOCUMENTS

| 2014/0375837 A1* | 12/2014 | Ichihara | ............... H04N 5/2354 348/222.1 |
| 2015/0261068 A1* | 9/2015 | Ooyama | ................ G03B 15/05 348/371 |
| 2016/0077406 A1* | 3/2016 | Hirasawa | ................ G01S 17/88 362/5 |
| 2016/0323488 A1* | 11/2016 | Aikawa | ................ H04N 5/2256 |

FOREIGN PATENT DOCUMENTS

JP 2011170014 A 9/2011

* cited by examiner

*Primary Examiner* — Mekonnen Dagnew
(74) *Attorney, Agent, or Firm* — Canon U.S.A., Inc. IP Division

(57) ABSTRACT

A setting unit sets a smaller limitation angle for rotation of a second case rotated by a driving unit relative to a first case when information output from a sensor disposed in a back surface of a first case indicates that an object does not exist in a certain range when compared with a case where the information output from the sensor indicates that an object exists in the certain range.

16 Claims, 17 Drawing Sheets

US 9,716,818 B2

ILLUMINATION APPARATUS HAVING FIRST CASE AND SECOND CASE ROTATABLE RELATIVE TO FIRST CASE, AND IMAGING APPARATUS HAVING DETACHABLE ILLUMINATION APPARATUS

BACKGROUND OF THE INVENTION

Field of the Invention

The present invention relates to an illumination apparatus and an imaging apparatus, and particularly relates to control of an illumination apparatus having a first case and a second case rotatable relative to the first case.

Description of the Related Art

In general, light emission photography (hereinafter referred to as "bounce light emission photography") of irradiating a subject with scattered reflection light obtained by irradiating light from an illumination apparatus to a ceiling or the like which reflects the light has been used. According to the bounce light emission photography, the illumination apparatus irradiates a subject with light in an indirect manner instead of a direct manner, and therefore, depiction with soft light is realized.

Furthermore, a technique of automatically determining an appropriate irradiation direction in the bounce light emission photography has been proposed. Japanese Patent Laid-Open No. 2011-170014 discloses a technique of irradiating a reflection body with light from a light emission unit at a rotation angle in which the light emission unit directs a user instead of a rotation angle in which the light emission unit directs a subject in a stroboscopic apparatus including the light emission unit in which the rotation angle thereof may be automatically changed.

However, in the technique disclosed in Japanese Patent Laid-Open No. 2011-170014, although the light emission unit may irradiate the reflection body with light at the rotation angle in which the light emission unit directs a user, a case where the light emission unit irradiates the user with the light is not taken into consideration.

SUMMARY OF THE INVENTION

Accordingly, the present invention provides a technique of preventing light emitted from an illumination apparatus from being incident on a user.

An illumination apparatus according to the present invention includes a first case detachably attached to an imaging apparatus, a second case rotatable relative to the first case, a light emission unit disposed on the second case, a driving unit configured to rotate the second case relative to the first case, a sensor configured to output information on presence or absence of an object in a certain range, and a setting unit configured to set a limitation angle for rotation of the second case rotated by the driving unit relative to the first case. The sensor is disposed in a back surface of the first case. The setting unit sets a smaller limitation angle when the information output from the sensor indicates that an object does not exist in the certain range when compared with a case where the information indicates that an object exists in the certain range.

Further features of the present invention will become apparent from the following description of exemplary embodiments with reference to the attached drawings.

DESCRIPTION OF THE EMBODIMENTS

First Embodiment

Figure 1:
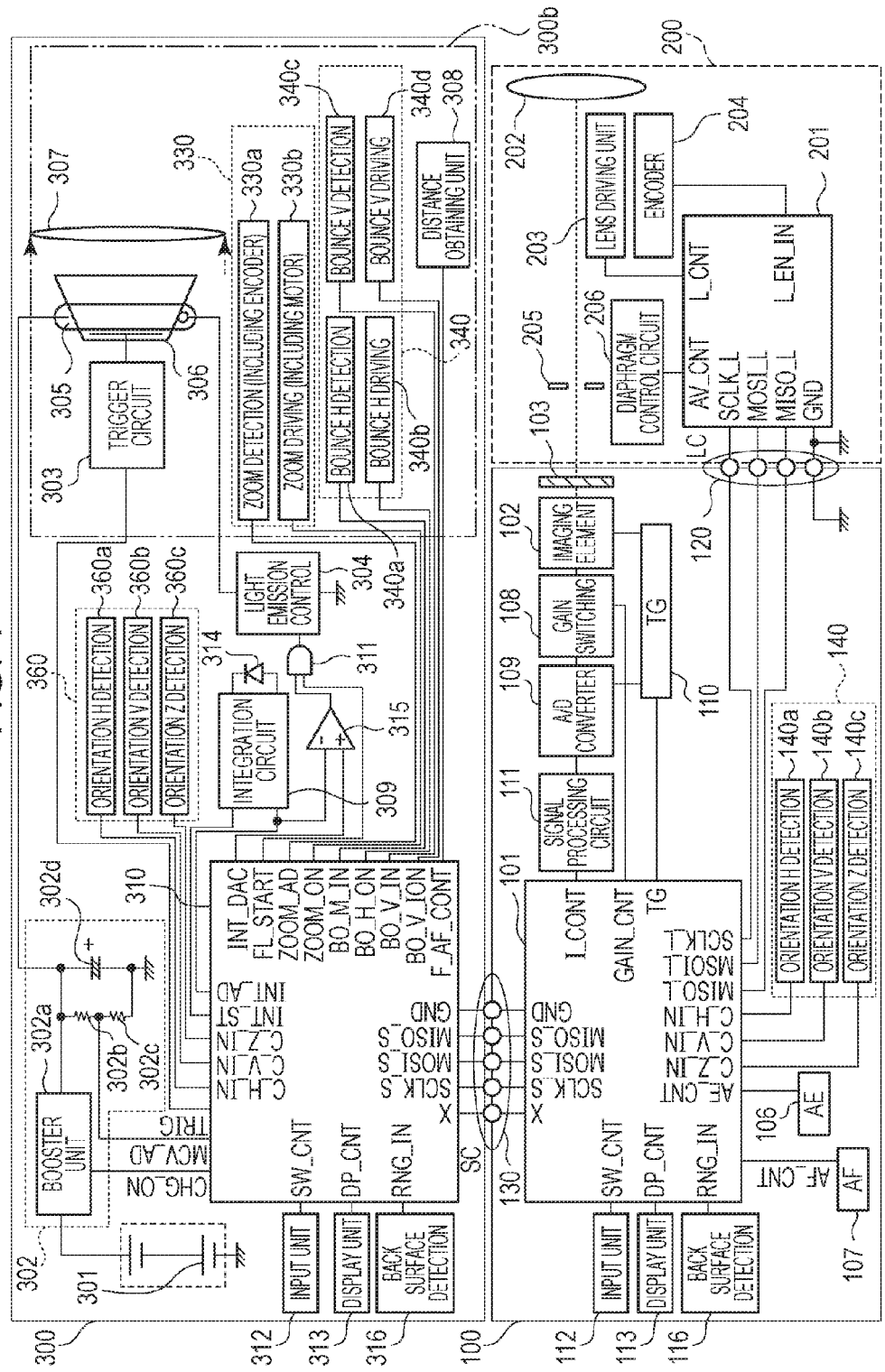
FIG. 1 is a block diagram schematically illustrating a configuration of an imaging system according to a first embodiment of the present invention.
Figure 2:
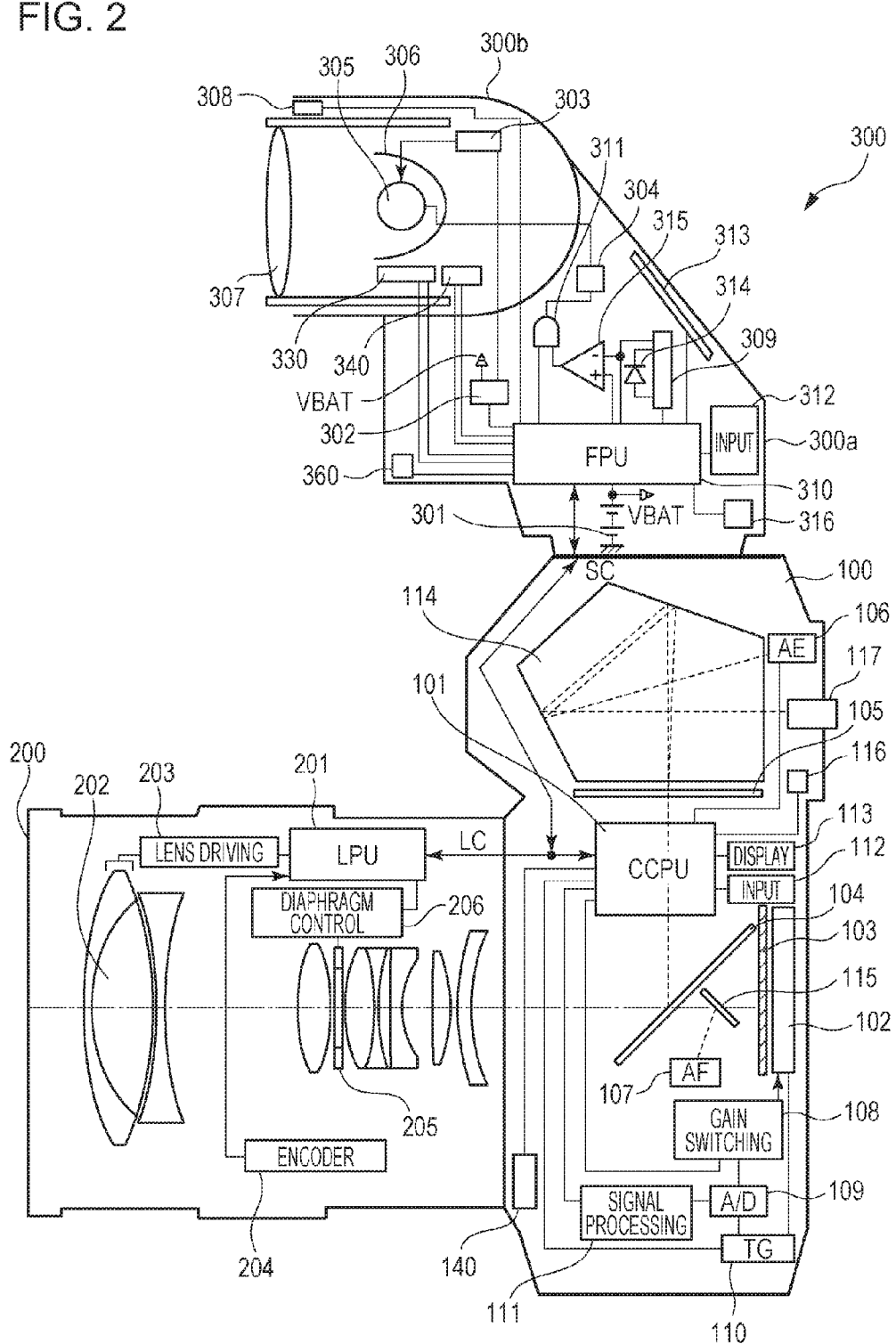
FIG. 2 is a block diagram schematically illustrating the configuration of the imaging system according to the first embodiment of the present invention.

Preferred embodiments of the present invention will be described in detail hereinafter with reference to the accompanying drawings. FIGS. 1 and 2 are diagrams schematically illustrating a configuration of an imaging system according to an embodiment of the present invention. The imaging system according to the embodiment of the present invention includes a camera body 100 serving as an imaging apparatus, a lens unit 200 detachably attached to the camera body 100, and a stroboscopic apparatus 300 serving as an illumination apparatus detachably attached to the camera body 100. Note that an imaging system employing a lens-incorporated imaging apparatus including the lens unit 200 which is not detachable from the camera body 100 may be used. The same components are denoted by common numerals in FIGS. 1 and 2.

First, a configuration of the camera body 100 will be described. A microcomputer CCPU (hereinafter referred to as a "camera microcomputer") 101 controls various units of the camera body 100. The camera microcomputer 101 has a configuration of a microcomputer-incorporated one-chip IC circuit including a CPU, a ROM, a RAM, an input/output control circuit (an I/O control circuit), a multiplexer, a timer circuit, an EEPROM, an A/D converter, and a D/A converter. The camera microcomputer 101 controls the imaging system by software, and the camera microcomputer 101 performs various condition determinations.

An imaging element 102 is a CCD sensor, a CMOS sensor, or the like, including an infrared cut filter and a low-pass filter, and forms an image of a subject using a lens group 202 described below at a time of photographing. A shutter 103 moves between a position for blocking light to the imaging element 102 and a position for exposing the imaging element 102 with light.

A main mirror (a half mirror) 104 moves between a position for reflecting a portion of light which enters from the lens group 202 so as to form an image on a focusing screen 105 and a position which is retracted from an optical path (a photographic optical path) of the light which enters from the lens group 202 to the imaging element 102. A subject image is formed on the focusing screen 105 and is checked by a photographer through an optical finder not illustrated.

A photometric circuit (an AE circuit) 106 including a photometric sensor divides a subject into a plurality of regions and performs photometry on the individual regions. The photometric sensor in the photometric circuit 106 expects an image of a subject formed on the focusing screen 105 through a pentaprism 114 described below. A focus detection circuit (an AF circuit) 107 includes a ranging sensor having a plurality of ranging points and outputs focus information, such as defocusing amounts of the individual ranging points.

A gain switching circuit 108 amplifies a signal output from the imaging element 102, and gain switching is performed using the camera microcomputer 101 in response to a photographing condition or an operation of the photographer.

An A/D converter 109 converts an amplified analog signal output from the imaging element 102 into a digital signal. A timing generator (TG) 110 synchronizes input of an amplified analog signal of the imaging element 102 and a conversion timing of the A/D converter 109 with each other.

A signal processing circuit 111 performs a signal process on image data which has been converted into a digital signal by the A/D converter 109.

An input unit 112 includes an operation unit including a power switch, a release switch, and a setting button, and the camera microcomputer 101 executes various processes in accordance with inputs to the input unit 112. When a first step of the release switch is operated (half press), a switch SW1 is turned on, and the camera microcomputer 101 starts a photographing preparation operation, such as focus control and photometry. When a second step of the release switch is operated (full press), a switch SW2 is turned on, and the camera microcomputer 101 starts a photographing operation, such as exposure and a development process. Furthermore, various settings may be performed on the stroboscopic apparatus 300 attached to the camera body 100 by operating the setting button or the like of the input unit 112. Furthermore, in a case where wireless communication is enabled, even if the stroboscopic apparatus 300 is not directly attached to the camera body 100, as with the case where the stroboscopic apparatus 300 is directly attached to the camera body 100, various settings may be performed on a plurality of stroboscopic apparatuses.

A display unit 113 including a liquid crystal device and a light emission element displays set various modes, other photographing information, and the like.

The pentaprism 114 guides a subject image on the focusing screen 105 to the photometric sensor included in the photometric circuit 106 and a finder 117. A sub-mirror 115 guides light which enters from the lens group 202 and transmitted through the main mirror 104 to the ranging sensor included in the focus detection circuit 107. Note that, although the optical finder which guides a subject image using the pentaprism 114 to the finder 117 is employed in this embodiment, an electronic finder which displays an image captured by the imaging element 102 or other imaging elements may be employed instead of the optical finder.

A back surface detection unit 116 is configured by modularizing an infrared LED and a light receiving unit and is disposed near the finder 117. The back surface detection unit 116 detects an object by an amount of infrared light which is reflected by the object when the object moves close to the back surface detection unit 116 and which is received by the light receiving unit. Note that the back surface detection unit 116 may have a general component other than the infrared LED and the light receiving unit, such as an illuminance sensor, an electrostatic sensor, or the like, as long as an object in a certain detection range may be detected. Furthermore, a sensor which measures a distance to an object is also included in the sensor for detecting an object within the certain detection range since the sensor determines whether an object is positioned within the certain detection range from a measured distance.

Communication lines LC and SC are signal lines serving as interfaces between the camera body 100 and the lens unit 200 and between the camera body 100 and the stroboscopic apparatus 300, respectively. Information communication such as data exchange and command transmission is mutually performed while the camera microcomputer 101 is used as a host, for example. As an example of the LC communication and the SC communication, three-terminal serial communication is employed in terminals 120 and 130 illustrated in FIG. 1. The terminal 120 includes an SCLK_L terminal for synchronization of communication between the camera body 100 and the lens unit 200, an MOSI_L terminal for transmission of data to the lens unit 200, and an MISO_L terminal for reception of data transmitted from the lens unit 200. The terminal 120 further includes a GND terminal which connects the camera body 100 and the lens unit 200 to each other.

The terminal 130 includes an SCLK_S terminal for synchronization of communication between the camera body 100 and the stroboscopic apparatus 300, an MOSI_S terminal for transmission of data to the stroboscopic apparatus 300, and an MISO_S terminal for reception of data transmitted from the stroboscopic apparatus 300. The terminal 130 further includes a GND terminal which connects the camera body 100 and the stroboscopic apparatus 300 to each other.

An orientation detection circuit 140 detects an orientation difference and includes an orientation H detection unit 140a which detects an orientation difference in a horizontal direction, an orientation V detection unit 140b which detects an orientation difference in a vertical direction, and an orientation Z detection unit 140*c* which detects an orientation difference in an anteroposterior direction (Z direction). As the orientation detection circuit 140, an angular velocity sensor or a gyro sensor is used, for example. Orientation information associated with orientation differences in the various directions detected by the orientation detection circuit 140 is supplied to the camera microcomputer 101. The camera microcomputer 101 may determine an orientation of the camera body 100 in accordance with a detection result of the orientation detection circuit 140. Note that, in this embodiment, a side of the camera body 100 in which the stroboscopic apparatus 300 is attachable is referred to as an "upper side", and left and right viewed from a side in which the finder 117 is disposed are referred to as a left side and a right side, respectively. Furthermore, in a case where the camera body 100 is inclined in a horizontal direction relative to a direction of gravitational force by 45 degrees or less, the camera body 100 is determined to be a horizontal position state. On the other hand, in a case where the camera body 100 is inclined in a horizontal direction relative to the direction of gravitational force by an angle larger than 45 degrees, the camera body 100 is determined to be a vertical position state. Note that the vertical position state includes a left vertical position state in which the upper side of the camera body 100 is inclined leftward and a right vertical position state in which the upper side of the camera body 100 is inclined rightward, and therefore, the left vertical position state and the right vertical position state are distinguished from each other in accordance with inclination of the camera body 100. Furthermore, a threshold value for distinguishing the horizontal position state from the vertical position state is not limited to 45 degrees, and other angles may be employed.

Next, a configuration and operation of the lens unit 200 will be described. A microcomputer LPU (hereinafter referred to as a "lens microcomputer") 201 controls various units of the lens unit 200.

The lens microcomputer 201 has a configuration of a microcomputer-incorporated one-chip IC circuit including a CPU, a ROM, a RAM, an input/output control circuit (an I/O control circuit), a multiplexer, a timer circuit, an EEPROM, an A/D converter, and a D/A converter.

The lens group 202 includes a plurality of lenses including a focus lens and a zoom lens. Note that the lens group 202 may not include a zoom lens. A lens driving unit 203 is a driving system which moves the lenses included in the lens group 202. A driving amount of the lens group 202 is calculated by the camera microcomputer 101 in accordance with an output of the focus detection circuit 107 included in the camera body 100. The calculated driving amount is transmitted from the camera microcomputer 101 to the lens microcomputer 201. An encoder 204 detects a position of the lens group 202 and outputs driving information. The lens driving unit 203 moves the lens group 202 by a driving amount based on the driving information supplied from the encoder 204 so that focus control is performed. A diaphragm 205 which controls an amount of light to be transmitted is controlled by the lens microcomputer 201 through a diaphragm control circuit 206.

Next, a configuration of the stroboscopic apparatus 300 will be described. The stroboscopic apparatus 300 includes a body portion 300*a* (a first case) detachably attached to the camera body 100 and a movable portion 300*b* (a second case) held in a movable manner in a vertical direction and a horizontal direction relative to the body portion 300*a*. Note that, in this embodiment, a rotation direction of the movable portion 300*b* is described on the assumption that a side of the body portion 300*a* which is coupled with the movable portion 300*b* is referred to as an "upper side" and left and right viewed from a side where an input unit 312 is disposed are referred to as a "left side" and a "right side", respectively.

A microcomputer FPU (hereinafter referred to as a "stroboscopic microcomputer") 310 controls various units of the stroboscopic apparatus 300. The stroboscopic microcomputer 310 has a configuration of a microcomputer-incorporated one-chip IC circuit including a CPU, a ROM, a RAM, an input/output control circuit (an I/O control circuit), a multiplexer, a timer circuit, an EEPROM, an A/D converter, and a D/A converter.

A battery 301 functions as a power source (VBAT) of the stroboscopic apparatus 300. A booster circuit block 302 includes a booster unit 302*a*, resistances 302*b* and 302*c* used for voltage detection, and a main capacitor 302*d*. The booster circuit block 302 charges the main capacitor 302*d* with electric energy for light emission by boosting a voltage of the battery 301 to several hundred V using the booster unit 302*a*.

The charged voltage in the main capacitor 302*d* is divided by the resistances 302*b* and 302*c* and the divided voltages are input to an A/D converter terminal of the stroboscopic microcomputer 310. A trigger circuit 303 applies a pulse voltage to an electric discharge tube 305 so as to excite the electric discharge tube 305 described below. A light emission control circuit 304 controls start and stop of light emission of the electric discharge tube 305. The electric discharge tube 305 is excited by receiving a pulse voltage of several KV applied from the trigger circuit 303 and emits light using electric energy charged in the main capacitor 302*d*.

An integration circuit 309 integrates a light receiving current of a photodiode 314 described below and an output of the integration circuit 309 is supplied to an inversion input terminal of a comparator 315 described below and the A/D converter terminal of the stroboscopic microcomputer 310. A non-inversion input terminal of the comparator 315 is connected to a D/A converter terminal of the stroboscopic microcomputer 310, and an output of the comparator 315 is supplied to an input terminal of an AND gate 311 described below. The other input of the AND gate 311 is connected to a light emission control terminal of the stroboscopic microcomputer 310, and an output of the AND gate 311 is input to the light emission control circuit 304. The photodiode 314 is a sensor which receives light emitted from the electric discharge tube 305 directly or through a glass fiber or the like.

A reflection umbrella 306 reflects light emitted from the electric discharge tube 305 so as to guide the light in a certain direction. A zoom optical system 307 including an optical panel and the like is held in a state in which a position thereof relative to the electric discharge tube 305 is changeable. A guide number and an irradiation range of the stroboscopic apparatus 300 may be changed by changing the relative position between the electric discharge tube 305 and the zoom optical system 307. A light emission unit of the stroboscopic apparatus 300 mainly includes the electric discharge tube 305, the reflection umbrella 306, and the zoom optical system 307. An irradiation range of the light emission unit is changed in accordance with a movement of the zoom optical system 307, and an irradiation direction of the light emission unit is changed in accordance with rotation of the movable portion 300*b*. Note that an LED may be used instead of the electric discharge tube 305 as a light source.

A distance obtaining unit 308 includes a light receiving sensor which receives light which is emitted from the electric discharge tube 305 and reflected by a subject, a ceiling, or the like. The distance obtaining unit 308 calculates information on a distance to the subject, the ceiling, or the like in accordance with an amount of the received light so as to obtain information on the distance to the subject, the ceiling, or the like. In an auto-bounce mode described below, the distance obtaining unit 308 obtains first information on a distance to a subject, and in addition, obtains second information on a distance to an object positioned in a direction different from a direction of the subject. Note that a general method may be employed for calculating information on a distance to a subject, a ceiling, or the like in accordance with an amount of received light. Furthermore, instead of calculation of information on a distance after reflection light of light emitted from the electric discharge tube 305 is received, calculation of information on a distance after reflection light of light emitted from a dedicated light source is received by a dedicated light receiving sensor may be performed. Furthermore, although the distance obtaining unit 308 obtains the first information and the second information in this embodiment, different distance obtaining units may be provided for obtaining the first information and the second information.

The input unit 312 includes an operation unit including a power switch, a mode setting switch for setting an operation mode of the stroboscopic apparatus 300, an auto-bounce start button for executing an auto-bounce operation, and a setting button for setting various parameters. Note that, in this embodiment, an operation of determining an irradiation direction of the light emission unit (an irradiation direction of light from the electric discharge tube 305) in the stroboscopic apparatus 300 and rotating the movable portion 300b using a bounce circuit 340 so that the movable portion 300b directs the determined irradiation direction is referred to as auto-bounce.

The stroboscopic microcomputer 310 executes various processes in accordance with inputs to the input unit 312.

A display unit 313 including a liquid crystal device and a light emission element displays various states of the stroboscopic apparatus 300.

A zoom driving circuit 330 includes a zoom detection unit 330a which detects information on a relative position between the electric discharge tube 305 and the zoom optical system 307 using an encoder or the like and a zoom driving unit 330b including a motor which moves the zoom optical system 307.

A driving amount of the zoom optical system 307 is calculated based on focus distance information which is output from the lens microcomputer 201 and which is obtained by the stroboscopic microcomputer 310 obtained through the camera microcomputer 101.

A back surface detection unit 316 is configured by modularizing an infrared LED and a detection sensor and is capable of detecting an object by an amount of infrared light which is reflected by the object when the object moves close to the back surface detection unit 316 and which is received by the detection sensor. Note that the back surface detection unit 316 may have a general configuration other than the configuration including the infrared LED and the light receiving unit, such as a configuration including an illuminance sensor, an electrostatic sensor, or the like, for example, as long as an object in a certain detection range may be detected (as long as the sensor outputs information on presence or absence of an object in a certain range). Furthermore, a sensor which measures a distance to an object is also included in the sensor which detects an object within the certain detection range since the sensor determines whether an object is positioned within the certain detection range from a measured distance. In a case where a sensor which measures a distance to an object is used, it is determined whether an object is detected within a certain detection range in accordance with a measurement result of the sensor (an output of the sensor). A position of the back surface detection unit 316 will be described below with reference to FIGS. 3A and 3B.

The bounce circuit 340 includes bounce angle detection circuits 340a and 340c which detect a driving amount of the movable portion 300b (an rotation angle of the movable portion 300b relative to the body portion 300a) and bounce driving circuits 340b and 340d which rotate the movable portion 300b.

The bounce angle detection circuit (a bounce H detection circuit) 340a detects a driving amount of the movable portion 300b in a horizontal direction and the bounce angle detection circuit (a bounce V detection circuit) 340c detects a driving amount of the movable portion 300b in a vertical direction using a rotary encoder or an absolute encoder.

The bounce driving circuit (a bounce H driving circuit) 340b drives the movable portion 300b in the horizontal direction and the bounce driving circuit (a bounce V driving circuit) 340d drives the movable portion 300b in the vertical direction using a general motor.

The orientation detection circuit 360 detects an orientation difference and includes an orientation H detection unit 360a which detects an orientation difference in the horizontal direction, an orientation V detection unit 360b which detects an orientation difference in the vertical direction, and an orientation Z detection unit 360c which detects an orientation difference in an anteroposterior direction (a Z direction). As the orientation detection circuit 360, an angular velocity sensor or a gyro sensor is used, for example. Orientation information on orientation differences in the various directions detected by the orientation detection circuit 360 is supplied to the stroboscopic microcomputer 310. The stroboscopic microcomputer 310 may determine an orientation of the body portion 300a in accordance with the detection result of the orientation detection circuit 360. Note that, in this embodiment, a side of the body portion 300a coupled with the movable portion 300b is referred to as an "upper side", and if the body portion 300a is inclined in the horizontal direction relative to a direction of gravitational force by an angle equal to or smaller than 45 degrees, the body portion 300a is determined to be a horizontal position state. On the other hand, in a case where the body portion 300a is inclined in the horizontal direction relative to the direction of gravitational force by an angle larger than 45 degrees, the body portion 300a is determined to be a vertical position state. Note that the vertical position state includes a left vertical position state in which the upper side of the body portion 300a is inclined leftward and a right vertical position state in which the upper side of the body portion 300a is inclined rightward, and therefore, the left vertical position state and the right vertical position state are distinguished from each other in accordance with an inclination of the body portion 300a. Furthermore, a threshold value for distinguishing the horizontal position state from the vertical position state is not limited to 45 degrees, and other angles may be employed.

Figure 3A:
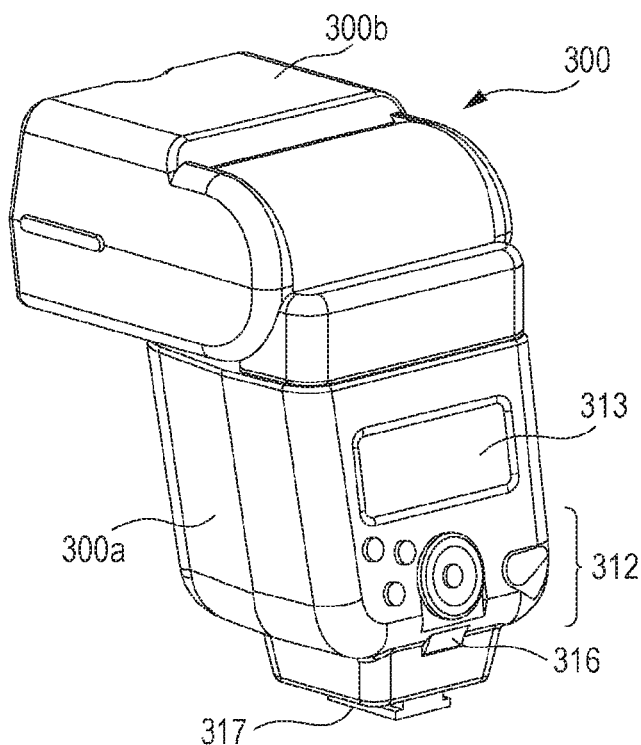
FIGS. 3A and 3B are diagrams illustrating a stroboscopic apparatus according to the first embodiment of the present invention.
Figure 3B:
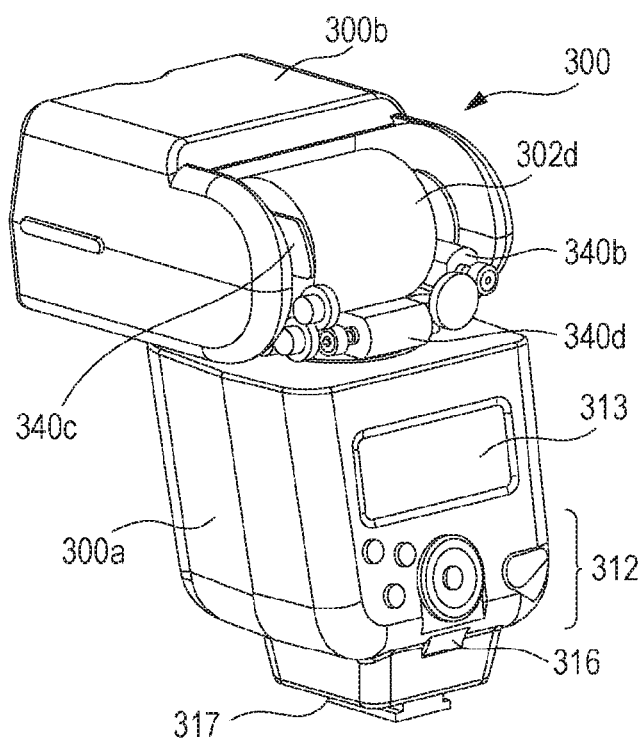

Next, layout of the various units included in the stroboscopic apparatus 300 will be described with reference to FIGS. 3A and 3B. In FIGS. 3A and 3B, reference numerals the same as those used in FIGS. 1 and 2 are assigned to components the same as those illustrated in FIGS. 1 and 2.

FIG. 3A is a diagram illustrating appearance of the stroboscopic apparatus 300, and FIG. 3B is a diagram illustrating the appearance of the stroboscopic apparatus 300 in a case where a portion of an outer covering of the stroboscopic apparatus 300 is removed.

In FIGS. 3A and 3B, a connection unit 317 is used to attach the body portion 300a to an accessory shoe disposed on an upper surface of the camera body 100. The camera body 100 is capable of communicating with the stroboscopic apparatus 300 through the terminal 130 disposed on the connection unit 317. As illustrated in FIG. 3A, the back surface detection unit 316 is disposed in a position in a center in the horizontal direction of a back surface of the body portion 300a and on a lower side relative to the input unit 312. In this way, the back surface detection unit 316 is disposed in the position so as to be capable of detecting a photographer who is looking into the finder 117 of the camera body 100 in a state in which the stroboscopic apparatus 300 is attached to the camera body 100 through the connection unit 317. That is, the detection sensor of the back surface detection unit 316 is disposed in a surface of the body portion 300a opposite to a surface near the subject in a state in which the body portion 300a is attached to the camera body 100.

Note that the position of the back surface detection unit 316 is not limited to the position illustrated in FIGS. 3A and 3B as long as the back surface detection unit 316 is disposed in the position so as to be capable of detecting the photographer who is looking into the finder 117 of the camera body 100 in the state in which the stroboscopic apparatus 300 is attached to the camera body 100 through the connection unit 317. Furthermore, a detection range of the back surface detection unit 316 is smaller than a predetermined distance in a predetermined direction from a position of the detection sensor. However, if the detection range is too large, the face of the photographer is detected even in a state in which the face of the photographer is separated from the finder 117, and therefore, it is preferable that the detection range is approximately 10 cm or less from the position of the detection sensor, for example. Furthermore, the detection range of the back surface detection unit 316 may be inclined downward so that the back surface detection unit 316 easily detects the photographer who is looking into the finder 117 of the camera body 100 in the state in which the stroboscopic apparatus 300 is attached to the camera body 100 through the connection unit 317.

Next, a process performed when the stroboscopic apparatus 300 emits light in the auto-bounce light emission photography will be described with reference to FIGS. 4 to 6, FIGS. 7A and 7B, and FIGS. 8A and 8B. Note that a case where a ceiling is used as a reflection surface in the bounce light emission photography will be described with reference to FIGS. 4 to 6, FIGS. 7A and 7B, and FIGS. 8A and 8B.

Figure 4:
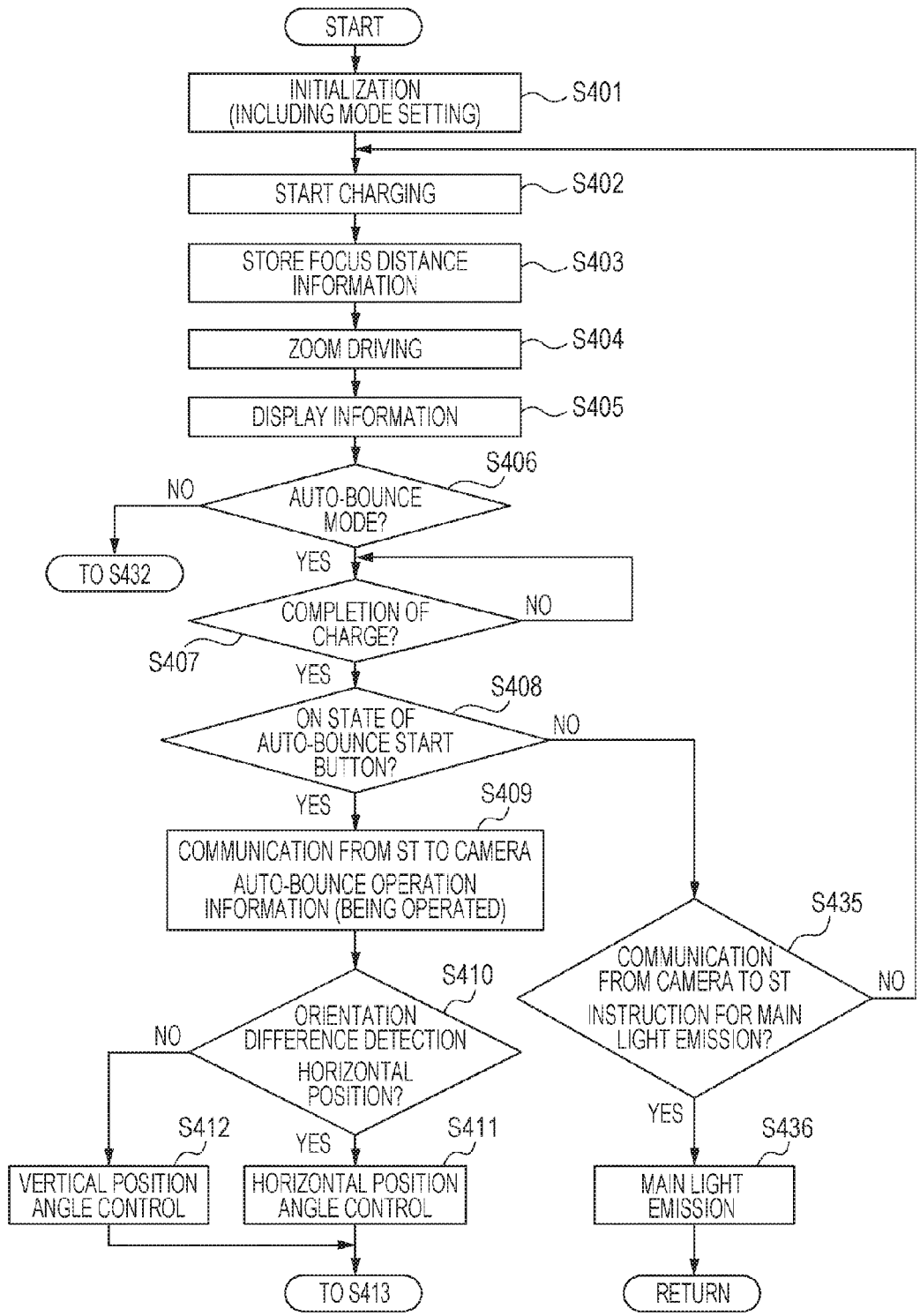
FIG. 4 is a flowchart illustrating various processes performed by the stroboscopic apparatus in auto-bounce light emission photography according to the first embodiment of the present invention.

When the power switch included in the input unit 312 is turned on and the stroboscopic microcomputer 310 of the stroboscopic apparatus 300 is activated, the stroboscopic microcomputer 310 starts a flowchart of FIG. 4.

In step S401, the stroboscopic microcomputer 310 initializes a memory and a port thereof. Furthermore, the stroboscopic microcomputer 310 reads states of the switches included in the input unit 312 and preset input information and sets various light emission modes, such as a method for determining an amount of light emission and a timing of light emission. Furthermore, the stroboscopic microcomputer 310 performs an initial setting of a threshold value of a bounce driving range (a limitation angle which limits a rotation angle of the movable portion 300b rotated by the bounce circuit 340) before proceeding to step S402. It is assumed that the threshold value is set to a first value described below in the initial setting, and the threshold value will be described in detail later.

In step S402, the stroboscopic microcomputer 310 starts operation of the booster circuit block 302 so that the main capacitor 302d is charged. After the charge of the main capacitor 302d is started, the process proceeds to step S403.

In step S403, the stroboscopic microcomputer 310 stores focus distance information of the lens unit 200 obtained from the camera microcomputer 101 through the communication line SC in an internal memory of the stroboscopic microcomputer 310. If the focus distance information has been stored by this time, the focus distance information is updated. After the focus distance information is stored, the process proceeds to step S404.

In step S404, the stroboscopic microcomputer 310 instructs the zoom driving circuit 330 to move the zoom optical system 307 so that an irradiation range of stroboscopic light corresponds to the obtained focus distance information. After the zoom optical system 307 is moved, the process proceeds to step S405. Note that the process may proceed to step S405 while the zoom optical system 307 is moved.

In step S405, the stroboscopic microcomputer 310 displays an image representing information on a light emission mode set by the input unit 312 and the obtained focus distance information in the display unit 313. Thereafter, the process proceeds to step S406.

In step S406, the stroboscopic microcomputer 310 determines whether the set light emission mode is an auto-bounce mode in which the auto-bounce light emission photography is executable. If the auto-bounce mode is detected, the process proceeds to step S407 whereas if a normal light emission mode in which the auto-bounce light emission photography is not executable is detected, the process proceeds to step S432. Note that the setting of the light emission mode may be performed by the input unit 312 or the input unit 112 through the camera microcomputer 101 and the communication line SC.

In step S407, the stroboscopic microcomputer 310 determines whether the charge of the main capacitor 302d is completed. When the determination is affirmative, the process proceeds to step S408 whereas when the determination is negative, the operation in step S407 is performed again.

In step S408, the stroboscopic microcomputer 310 determines whether the auto-bounce start button included in the input unit 312 has been turned on. When the determination is affirmative, the process proceeds to step S409 whereas when the determination is negative, the process proceeds to step S435. If a configuration in which an instruction for executing an auto-bounce operation is supplied from the camera body 100 to the stroboscopic apparatus 300 by operating the input unit 112 of the camera body 100 is employed, the stroboscopic microcomputer 310 additionally determines whether the instruction has been supplied from the camera body 100.

In step S409, the stroboscopic microcomputer 310 transmits information indicating that the auto-bounce operation is being executed as auto-bounce operation information to the camera microcomputer 101 through the communication line SC.

In step S410, the stroboscopic microcomputer 310 determines an orientation of the body portion 300a in accordance with a detection result of the orientation detection circuit 360 in order to determine a rotation angle of the movable portion 300b at a time when the electric discharge tube 305 emits light to obtain information on a distance to a ceiling. The stroboscopic microcomputer 310 stores a detection result of the orientation detection circuit 360 in the internal memory of the stroboscopic microcomputer 310 and determines whether the body portion 300a is in the horizontal position state or the vertical position state. When the horizontal position state is detected, the process proceeds to step S411 whereas when the vertical position state is detected, the process proceeds to step S412. In the state in which the stroboscopic apparatus 300 is attached to the camera body 100, an orientation of the camera body 100 corresponds to an orientation of the body portion 300a, and therefore, a detection result of the orientation detection circuit 140 may be used instead of the detection result of the orientation detection circuit 360. Furthermore, in the state in which the stroboscopic apparatus 300 is attached to the camera body 100, the orientation of the body portion 300a may be determined if the orientation of the camera body 100 may be detected, and therefore, the stroboscopic apparatus 300 may not include the orientation detection circuit 360.

In step S411, the stroboscopic microcomputer 310 employs horizontal position angle control as control for determining a rotation angle of the movable portion 300b at a time when the electric discharge tube 305 emits light to obtain information on a distance to a ceiling. When the horizontal position angle control is employed, information indicating that the horizontal position angle control has been employed is stored in the internal memory of the stroboscopic microcomputer 310, and the movable portion 300b is rotated upward using the bounce driving circuit 340d so that information on the distance to the ceiling is obtained. A process employing the horizontal position angle control, such as the process of rotating the body portion 300a upward using the bounce driving circuit 340d, is performed after step S419 described below. After the horizontal position angle control is employed, the process proceeds to step S413.

In step S412, the stroboscopic microcomputer 310 employs vertical position angle control as control for determining a rotation angle of the movable portion 300b at a time when the electric discharge tube 305 emits light to obtain information on a distance to a ceiling. When the vertical position angle control is employed, information indicating that the vertical position angle control has been employed is stored in the internal memory of the stroboscopic microcomputer 310 and the movable portion 300b is rotated leftward or rightward using the bounce driving circuit 340b so that information on the distance to the ceiling is obtained. A determination as to whether the movable portion 300b is rotated leftward or rightward using the bounce driving circuit 340b is made depending on the left vertical position state or the right vertical position state.

Furthermore, a process employing the vertical position angle control, such as the process of rotating the movable portion 300b leftward or rightward using the bounce driving circuit 340d, is performed after step S419 described below. After the vertical position angle control is employed, the process proceeds to step S413.

In step S413, the stroboscopic microcomputer 310 rotates the movable portion 300b so that an irradiation direction of the light emission unit corresponds to a front direction using the bounce circuit 340. The front direction is substantially parallel to an imaging optical axis of the camera body 100, and in this embodiment, the irradiation direction of the light emission unit corresponds to the front direction when a vertical rotation angle of the movable portion 300b is 0 degree and a horizontal rotation angle is 0 degree. In a case where it is determined that the irradiation direction corresponds to the front direction in accordance with angle detection results of the bounce angle detection circuits 340a and 340c, this step may be omitted. Thereafter, the process proceeds to step S414.

In step S414, the stroboscopic microcomputer 310 determines whether the irradiation direction of the light emission unit corresponds to the front direction in accordance with the angle detection results of the bounce angle detection circuits 340a and 340c. The stroboscopic microcomputer 310 stores the current angle detection results of the bounce angle detection circuits 340a and 340c in the internal memory of the stroboscopic microcomputer 310, and when the irradiation direction of the light emission unit corresponds to the front direction, the process proceeds to step S415, and otherwise, the process proceeds to step S416.

In step S415, the stroboscopic microcomputer 310 emits light from the electric discharge tube 305 so as to obtain information on a distance to the subject. After the light emission, the stroboscopic microcomputer 310 instructs the distance obtaining unit 308 to calculate information on the subject distance based on a result of reception of reflection light from the subject received by the light receiving sensor. The stroboscopic microcomputer 310 stores a result of the calculation of the information on the subject distance in the internal memory of the stroboscopic microcomputer 310, and the process proceeds to step S419.

In step S416, the stroboscopic microcomputer 310 determines whether an instruction for terminating the auto-bounce operation transmitted from the camera microcomputer 101 has been obtained through the communication line SC. In a case where the stroboscopic microcomputer 310 obtains the instruction for terminating the auto-bounce operation, the auto-bounce operation is terminated and the process returns to step S402. Otherwise, the process proceeds to step S417.

In step S417, the stroboscopic microcomputer 310 determines whether a predetermined period of time has been elapsed after the rotation of the movable portion 300b is started so that the irradiation direction of the light emission unit corresponds to the front direction. When the determination is affirmative, the process proceeds to step S418 whereas when the determination is negative, the process returns to step S414.

In step S418, the stroboscopic microcomputer 310 transmits information indicating that the auto-bounce operation is in an error state as the auto-bounce operation information to the camera microcomputer 101 through the communication line SC, and returns to step S402.

In step S419, the stroboscopic microcomputer 310 rotates the movable portion 300b so that the irradiation direction of the light emission unit corresponds to a ceiling direction using the bounce circuit 340. Thereafter, the process proceeds to step S420.

In step S420, the stroboscopic microcomputer 310 determines whether the irradiation direction of the light emission unit corresponds to the ceiling direction in accordance with angle detection results of the bounce angle detection circuits 340a and 340c. The stroboscopic microcomputer 310 stores the current angle detection results of the bounce angle detection circuits 340a and 340c in the internal memory of the stroboscopic microcomputer 310, and when the irradiation direction of the light emission unit corresponds to the ceiling direction, the process proceeds to step S421, and otherwise, the process proceeds to step S422.

In step S421, the stroboscopic microcomputer 310 emits light from the electric discharge tube 305 so as to obtain information on a distance to the ceiling. After the light emission, the stroboscopic microcomputer 310 instructs the distance obtaining unit 308 to calculate information on the ceiling distance based on a result of reception of reflection light from the ceiling received by the light receiving sensor. The stroboscopic microcomputer 310 stores a result of the calculation of the information on the ceiling distance in the internal memory of the stroboscopic microcomputer 310, and the process proceeds to step S425.

In step S422, the stroboscopic microcomputer 310 determines whether an instruction for terminating the auto-bounce operation transmitted from the camera microcomputer 101 has been obtained through the communication line SC. When the stroboscopic microcomputer 310 obtains the instruction for terminating the auto-bounce operation, the auto-bounce operation is terminated and the process returns to step S402. Otherwise, the process proceeds to step S423.

In step S423, the stroboscopic microcomputer 310 determines whether a predetermined period of time has been elapsed after the rotation of the movable portion 300b is started so that an irradiation direction of the light emission unit corresponds to the ceiling direction. When the determination is affirmative, the process proceeds to step S424 whereas when the determination is negative, the process returns to step S420.

In step S424, the stroboscopic microcomputer 310 transmits information indicating that the auto-bounce operation is in an error state as the auto-bounce operation information to the camera microcomputer 101 through the communication line SC, and returns to step S402.

In step S425, the stroboscopic microcomputer 310 determines the irradiation direction of the light emission unit suitable for the bounce light emission photography in accordance with the orientation detection result of step S410 and the obtaining results of step S415 and step S421. For example, the stroboscopic microcomputer 310 calculates the rotation angle of the movable portion 300b in accordance with the orientation detection result of step S410 and the obtaining results of step S415 and S421 so as to determine the irradiation direction of the light emission unit suitable for the bounce light emission photography.

Figure 7A:
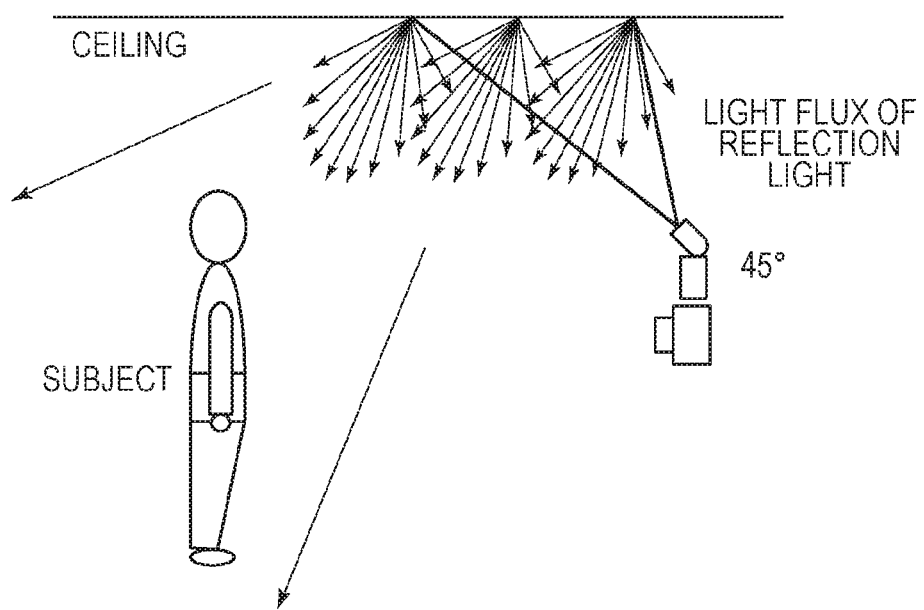
FIGS. 7A and 7B are diagrams illustrating the relationships between light emitted from the stroboscopic apparatus and a subject in the bounce light emission photography.
Figure 7B:
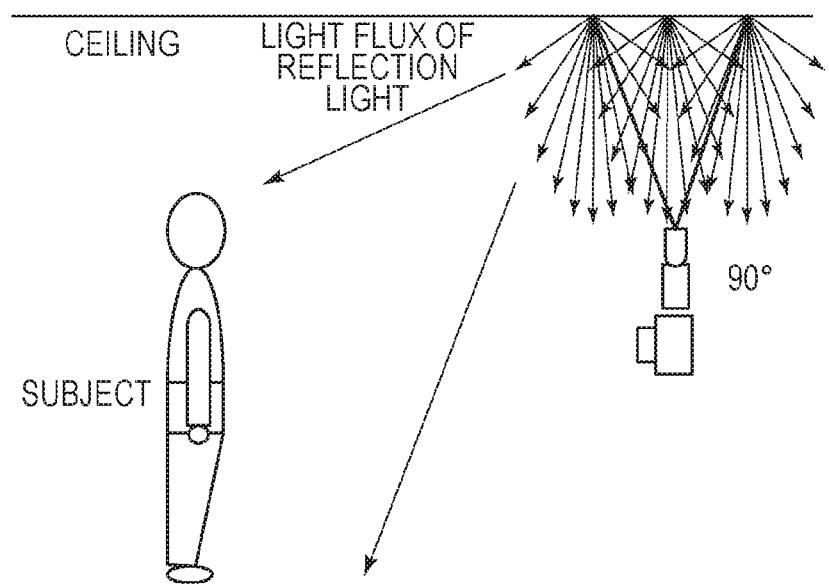

Here, a method for determining the irradiation direction of the light emission unit suitable for the bounce light emission photography will be described with reference to FIGS. 7A and 7B and FIGS. 8A and 8B. FIGS. 7A and 7B are diagrams illustrating the relationship between light emitted from the stroboscopic apparatus 300 and the subject in the bounce light emission photography. FIG. 7A is a diagram illustrating a case where a rotation angle of the movable portion 300b is 45 degrees in an upper direction and 0 degree in the horizontal direction, and FIG. 7B is a diagram illustrating a case where a rotation angle of the movable portion 300b is 90 degrees in the upper direction and 0 degree in the horizontal direction.

As illustrated in FIGS. 7A and 7B, when the rotation angle of the movable portion 300b is small, scattered reflection light from the ceiling is emitted to the subject like a top light, and therefore, a shadow of a chin or the like of the subject is likely to be large and dark. On the other hand, when the rotation angle of the movable portion 300b is large, a reflection surface in the ceiling is far from the subject, and therefore, scattered reflection light from the ceiling is incident on the subject at a small angle and shadow of the subject is likely to be small and light. However, the incident angle to the subject is too small, the shadow of the subject is too light which is unnatural.

As described above, the shadow of the subject at the time of the bounce light emission photographing is affected by an incident angle of the scattered reflection light from the ceiling to the subject.

Next, a method for calculating a rotation angle of the movable portion 300b for generating an appropriate shadow of the subject at the time of the bounce light emission photography will be described as an example with reference to FIGS. 8A and 8B. It is assumed that, in FIGS. 8A and 8B, a distance in the horizontal direction indicates a distance in a direction orthogonal to the direction of gravitational force, and the stroboscopic apparatus 300 is not inclined in the anteroposterior direction.

Figure 8A:
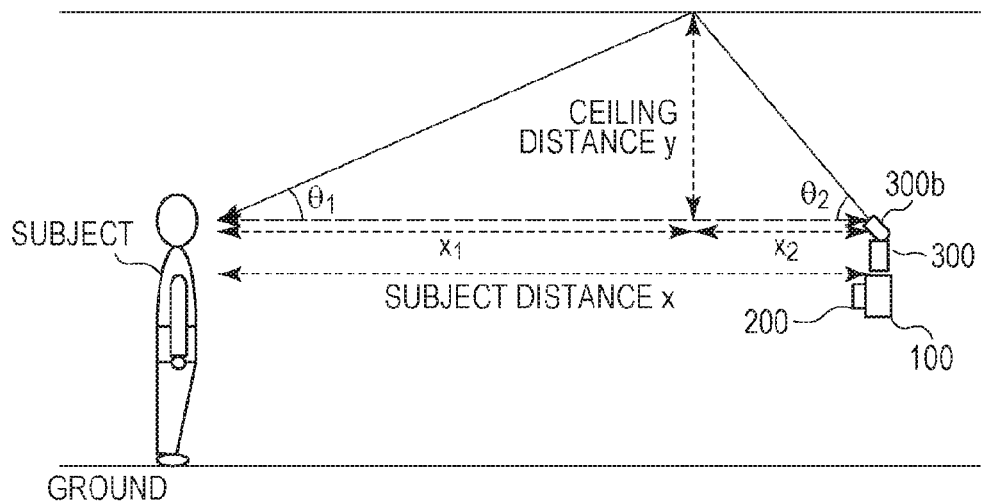
FIGS. 8A to 8B are diagrams illustrating the positional relationships between the stroboscopic apparatus and the subject in the bounce light emission photography.
Figure 8B:
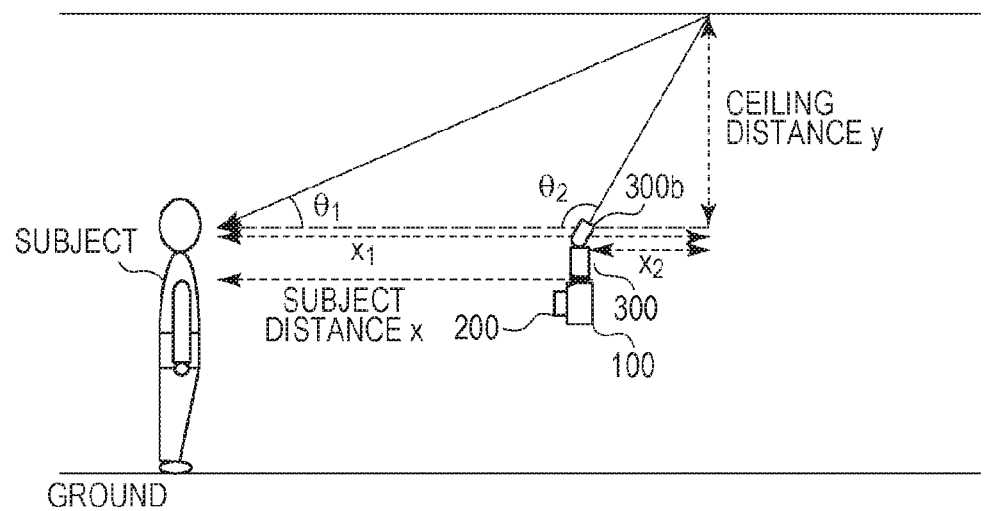

FIGS. 8A and 8B are diagrams illustrating the positional relationships between the stroboscopic apparatus 300 and the subject in the bounce light emission photography. In FIGS. 8A and 8B, a distance from a light emission reference surface of the stroboscopic apparatus 300 to the subject (a subject distance) is denoted by x, and a distance from the light emission reference surface to the ceiling (a ceiling distance) is denoted by y. Furthermore, a distance to the subject from an intersection between a straight line connecting the subject and the light emission reference surface and a vertical line from a ceiling reflection portion is denoted by $x_1$, and a distance from the intersection to the light emission reference surface is denoted by $x_2$. In this embodiment, the light emission reference surface emits light from the electric discharge tube 305 to an outside of the stroboscopic apparatus 300, and corresponds to a light irradiation surface of the optical panel disposed in front of the electric discharge tube 305, for example. Furthermore, in this embodiment, the ceiling reflection portion corresponds to an intersection between a center axis of light flux emitted from the electric discharge tube 305 to the outside of the stroboscopic apparatus 300 and the ceiling.

Furthermore, an angle defined by a center axis of the scattered reflection light from the ceiling reflection portion to be incident on the subject and the straight line connecting the subject and the light emission reference surface is denoted by $\theta_1$, and an angle defined by a center axis of the light flux emitted to the outside of the stroboscopic apparatus 300 and the straight line connecting the subject and the light emission reference surface is denoted by $\theta_2$.

Here, when the distance to the light emission reference surface from the intersection between the straight line connecting the subject and the light emission reference surface and the vertical line from the ceiling reflection portion is denoted by $x_2$, $x_2$ is obtained by Expression (1).

$$x_2 = x - (y/\tan \theta_1) \tag{1}$$

Furthermore, $\theta_2$ is obtained by Expression (2) below.

$$\theta_2 = \tan^{-1}\{y \tan \theta_1/(x \tan \theta_1 - y)\} \tag{2}$$

According to Expression (2), assuming that the angle $\theta_1$ is changed to an appropriate angle $\theta_1'$ predetermined by experiment or the like, a rotation angle $\theta_2'$ of the movable portion 300b suitable for the bounce light emission photography may be calculated in accordance with the subject distance x and the ceiling distance y. For example, in a case where the appropriate angle $\theta_1'$ is 30 degrees, the subject distance x is 3 m, and the ceiling distance y is 1.4 m, the rotation angle $\theta_2'$ is approximately 68 degrees according to Expression (2). Furthermore, in a case where the subject and the stroboscopic apparatus 300 are positioned comparatively close to each other as illustrated in FIG. 8B, that is, in a case where the appropriate angle $\theta_1'$ is 30 degrees, the subject distance x is 2 m, and the ceiling distance y is 1.4 m, for example, the rotation angle $\theta_2'$ is approximately 107 degrees according to Expression (2).

The method for determining an irradiation direction of the light emission unit suitable for the bounce light emission photography is not limited to the method described above, and other general methods may be employed. Furthermore, the appropriate angle $\theta_1'$ may be an angle other than 30 degrees.

After determining an irradiation direction of the light emission unit suitable for the bounce light emission photography, the stroboscopic microcomputer 310 stores a result of the determination in the internal memory of the stroboscopic microcomputer 310 and proceeds to step S426.

In step S426, the stroboscopic microcomputer 310 determines whether the back surface detection unit 316 has detected an object. When the back surface detection unit 316 has detected an object (information output from the sensor of the back surface detection unit 316 indicates that an object exists in a predetermined range), information indicating that an object has been detected is stored in the internal memory of the stroboscopic microcomputer 310, and the process proceeds to step S427a. On the other hand, when the back surface detection unit 316 has not detected an object (information output from the sensor of the back surface detection unit 316 indicates that an object does not exist in the predetermined range), information indicating that an object has not been detected is stored in the internal memory of the stroboscopic microcomputer 310, and the process proceeds to step S427b. In a case where information on the back surface detection unit 116 may be obtained from the camera microcomputer 101 through the communication line SC, an output of the back surface detection unit 116 may be used instead of an output of the back surface detection unit 316. Furthermore, a combination of an output of the back surface detection unit 116 and an output of the back surface detection unit 316 may be used. Moreover, the back surface detection unit 316 may constantly perform the detection process such that the back surface detection unit 316 constantly performs monitoring so as to determine whether an object exists in a detection range or may perform the detection process periodically. Furthermore, an output of the back surface detection unit 316 to be used in step S426 is preferably obtained immediately before the auto-bounce start button is turned on or after the auto-bounce start button is turned on since a difference between a latest output and an actual state is small.

In step S427a, the stroboscopic microcomputer 310 performs resetting such that a first value is set to a threshold value of the bounce driving range. If the first value has already been set, this step may be omitted. After the resetting of the threshold value, the set threshold value is stored in the internal memory of the stroboscopic microcomputer 310, and the process proceeds to step S428.

In step S427b, the stroboscopic microcomputer 310 performs resetting such that a second value which is smaller than the first value is set to the threshold value of the bounce driving range. If the second value has already been set, this step may be omitted. After the resetting of the threshold value, the set threshold value is stored in the internal memory of the stroboscopic microcomputer 310, and the process proceeds to step S428.

In step S428, the stroboscopic microcomputer 310 calculates a driving amount for rotation of the movable portion 300b in accordance with the calculation result of step S425, the detection results of the bounce angle detection circuits 340a and 340c, and the threshold value set in step S427a or step S427b.

Figure 9A:
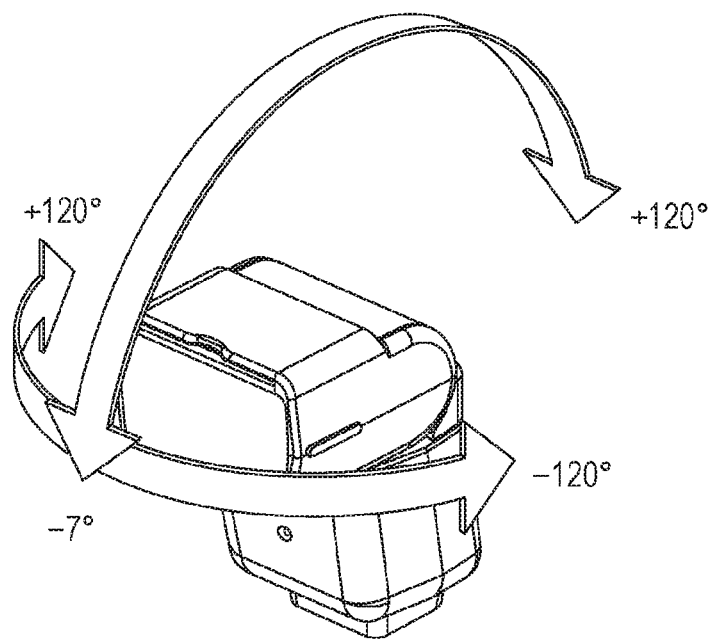
FIGS. 9A and 9B are diagrams illustrating a bounce driving range of the stroboscopic apparatus.
Figure 9B:

The relationship between an output of the back surface detection unit 316 and the threshold value of the bounce driving range will be described with reference to FIGS. 9A and 9B. As illustrated in FIG. 9A, in an initial setting, the stroboscopic apparatus 300 of this embodiment may rotate the movable portion 300b by 120 degrees in an upper direction, 7 degrees in a lower direction, and 120 degrees in left and right directions at maximum from a position in which the irradiation direction of the light emission unit corresponds to the front direction. Specifically, it is assumed that the first value is 120 degrees.

In the case where the threshold value of the bounce driving range is 120 degrees, a degree of freedom of change of the irradiation direction of the light emission unit is large, and if the movable portion 300b is rotated at maximum, the light emission unit may emit light behind the movable portion 300b.

If the light emission unit emits light behind the movable portion 300b, the light emission unit may irradiate the face of the photographer with the light depending on a position of the face of the photographer. For example, as illustrated in FIG. 9B, if the light emission unit emits light behind the movable portion 300b in a state in which the face of the photographer is separated from the camera body 100, it is likely that the light emitted from the light emission unit is incident on the face of the photographer. On the other hand, if the light emission unit emits light behind the movable portion 300b in a state in which the face of the photographer is close to the camera body 100 so that the photographer looks into the finder 117 of the camera body 100, the light emitted from the light emission unit is not incident on the face of the photographer.

Accordingly, in this embodiment, in a case where the face of the photographer is close to the camera body 100 and therefore the light from the light emission unit is not incident on the face of the photographer even when the light emission unit emits the light behind the movable portion 300b, a large threshold value of the bounce driving range is set. On the other hand, in a case where the face of the photographer is separated from the camera body 100, and therefore, the light from the light emission unit may be incident on the face of the photographer when the light emission unit emits the light behind the movable portion 300b, a small threshold value of the bounce driving range is set.

In this embodiment, a smaller threshold value of the bounce driving range is set in a case where the back surface detection unit 316 does not detect an object when compared with a case where the back surface detection unit 316 detects an object, for example. As described above, by changing the threshold value of the bounce driving range in accordance with an output of the back surface detection unit 316, light from the illumination apparatus is prevented from being incident on the photographer (a user).

In step S428, when a rotation angle represented by the calculation result of step S425 exceeds a limitation angle which is the threshold value of the bounce driving range, the limitation angle is set as a target angle of the movable portion 300b and a driving amount for rotation of the movable portion 300b is calculated. When the rotation angle represented by the calculation result of step S425 does not exceed the limitation angle which is the threshold value of the bounce driving range, the rotation angle represented by the calculation result is set as the target angle of the movable portion 300b and a driving amount for rotation of the movable portion 300b is calculated.

Furthermore, in a case where an orientation of the stroboscopic apparatus 300 is inclined at a time of the calculation of the bounce driving amount, the driving amount is corrected in accordance with a detection result of the orientation detection circuit 360. The driving amount is corrected by, for example, detecting inclinations of axes of the orientation detection circuit 360 and calculating a correction driving amount which cancels the inclinations so that the calculated driving amount is obtained. However, if a result of the correction of the driving amount exceeds the set threshold value of the bounce driving range, another correction method is changed depending on an output of the back surface detection unit 316.

In a case where the back surface detection unit 316 has detected an object, the set threshold value is also corrected, whereas in a case where the back surface detection unit 316 has not detected an object, the set threshold value is not corrected. For example, in a case where the first threshold value is set, a rotation angle represented by the calculation result is 120 degrees, and a correction driving amount is γ, the first threshold value is corrected so that the bounce driving range is limited by 120+γ degrees. The case where the back surface detection unit 316 has detected an object is seen to be the state in which the face of the photographer is close to the camera body 100 so that the photographer looks into the finder 117 of the camera body 100, and therefore, it is not likely that the light from the illumination apparatus is incident on the photographer (the user) even if a large bounce driving range is set. Therefore, in the case where the back surface detection unit 316 has detected an object, the bounce driving range is corrected to be larger in accordance with an orientation of the stroboscopic apparatus 300. Note that the bounce driving range is not corrected to be smaller.

In a case where a second threshold value is set, a rotation angle represented by the calculation result is 90 degrees, and the correction driving amount is γ, the second threshold value is not corrected and a maximum degree of the bounce driving range is set to 90 degrees. The case where the back surface detection unit 316 has not detected an object is seen to be the state in which the face of the photographer is separated from the camera body 100, and therefore, it is likely that the light from the illumination apparatus is incident on the photographer (the user) if a large bounce driving range is set. Therefore, in the case where the back surface detection unit 316 has not detected an object, the bounce driving range is not corrected to be larger or smaller in accordance with an orientation of the stroboscopic apparatus 300.

Note that the detection result of the orientation detection circuit 140 may be used also here instead of the detection result of the orientation detection circuit 360.

After the calculation of the driving amount, the calculated result is stored in the internal memory of the stroboscopic microcomputer 310, and the process proceeds to step S429.

In step S429, the stroboscopic microcomputer 310 rotates the movable portion 300b using the bounce circuit 340 in accordance with the calculation result of step S428. Thereafter, the process proceeds to step S430.

In step S430, the stroboscopic microcomputer 310 determines whether the movable portion 300b has the target angle (in the calculated position) in accordance with the detection results of the bounce angle detection circuits 340a and 340c. When the determination is affirmative, the process proceeds to step S432 whereas when the determination is negative, the process proceeds to step S431.

In step S431, the stroboscopic microcomputer 310 determines whether a predetermined period of time has been elapsed after the rotation of the movable portion 300b is started so that the movable portion 300b has the target angle. When the determination is affirmative, the process proceeds to step S432 whereas when the determination is negative, the process proceeds to step S430.

In step S432, the stroboscopic microcomputer 310 determines whether a charge voltage of the main capacitor 302d is equal to or larger than a predetermined value (completion of charge), and when the determination is affirmative, the process proceeds to step S434 whereas when the determination is negative, the process proceeds to step S433.

In step S433, the stroboscopic microcomputer 310 activates the booster circuit block 302 again so that the main capacitor 302d is charged again. After the charging, the process proceeds to step S434.

In step S434, the stroboscopic microcomputer 310 performs a charge completion process including transmission of a charge completion signal to the camera microcomputer 101, and the process proceeds to step S435.

In step S435, the stroboscopic microcomputer 310 determines whether a light emission start signal has been received from the camera microcomputer 101 as a light emission instruction, and when the determination is affirmative, the process proceeds to step S436 whereas when the determination is negative, the process returns to step S402.

In step S436, the stroboscopic microcomputer 310 instructs the light emission control circuit 304 to emit light in response to the received light emission start signal, the light emission control circuit 304 causes the electric discharge tube 305 to emit light in response to the light emission instruction, and thereafter, the process returns to step S402. Note that, in step S436, in a series of light emission including pre-light emission for calculation of an amount of main light emission and the main light emission, the process returns to step S402 after the series of light emission is terminated.

The process performed at a time of light emission of the stroboscopic apparatus 300 including the auto-bounce operation is thus executed.

Note that the flowcharts of this embodiment are merely examples, and the various processes may be executed by order different from the flowchart of this embodiment unless inconvenience is caused. Furthermore, although this embodiment is described on assumption that the ceiling is used as the reflection surface in the bounce light emission photography, any reflection surface, such as a wall, may be employed instead of the ceiling as long as a desired direction is set to a mode.

As described above, in this embodiment, the bounce light emission photography may be efficiently performed by changing the limitation angle of the bounce driving range based on an output of the back surface detection unit 316 at the time of the bounce light emission photography, and light from the illumination apparatus is prevented from being incident on the user.

Second Embodiment

Hereinafter, a second embodiment of the present invention will be described with reference to FIG. 10. An imaging system of this embodiment is the same as that of the first embodiment, and therefore, descriptions of apparatuses included in the imaging system are omitted. This embodiment is different from the first embodiment in that an irradiation direction of a light emission unit manually set by a photographer is stored in an internal memory of a stroboscopic microcomputer 310 and a movable portion 300b is rotated so that the stored irradiation direction is realized in automatic driving control. In this embodiment, when an auto-bounce start button of an input unit 312 is operated after the photographer manually rotates the movable portion 300b, a current rotation angle of the movable portion 300b is stored. Next, when a switch SW1 of a camera body 100 is turned on, the movable portion 300b is rotated such that an irradiation direction of the light emission unit at a time when the rotation angle is stored is obtained in accordance with the stored rotation angle and an orientation difference of the stroboscopic apparatus 300 at the time when the rotation angle is stored. Hereinafter, an operation of rotating the movable portion 300b such that the irradiation direction of the light emission unit at the time when the rotation angle is stored is obtained is referred to as "semi-auto-bounce". As described above, in the semi-auto-bounce, a process of calculating the irradiation direction of the light emission unit in accordance with first information based on a distance to a subject and second information based on a distance to an object positioned in a direction different from a direction of the subject is not performed. Note that, in this embodiment, as described in the first embodiment, a bounce driving range at a time of auto-bounce light emission photography is set in accordance with an output of a back surface detection unit 316 and a bounce driving range at a time of semi-auto bounce light emission photography is set as described below. A process of setting the bounce driving range at the time of the auto-bounce light emission photography in accordance with an output of the back surface detection unit 316 is the same as that of the first embodiment, and therefore, a description thereof is omitted.

Figure 10:
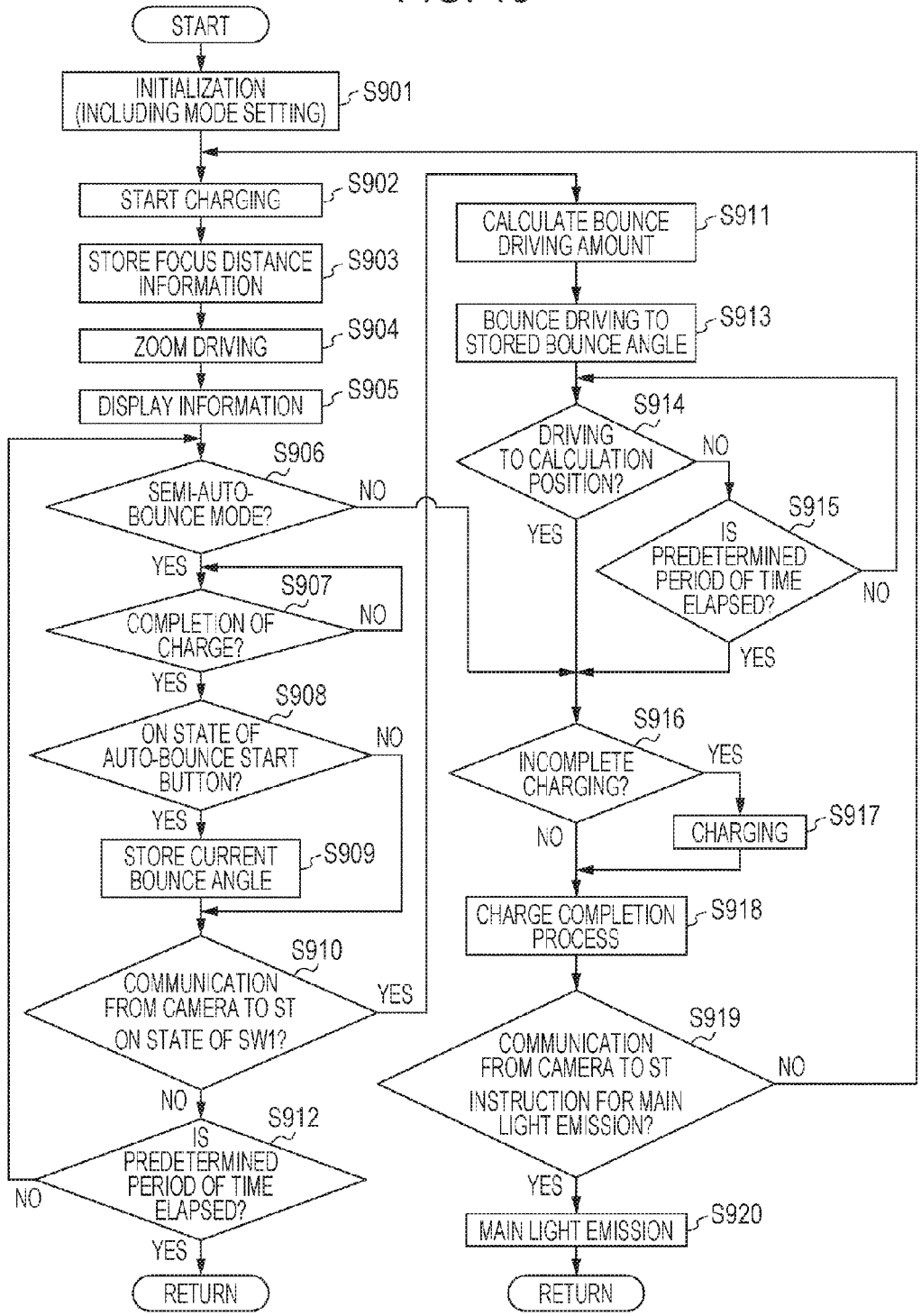
FIG. 10 is a flowchart illustrating various processes performed by a stroboscopic apparatus in auto-bounce light emission photography according to a second embodiment of the present invention.

FIG. 10 is a flowchart illustrating a process performed when a stroboscopic apparatus 300 emits light in the semi-auto bounce light emission photography. Detailed descriptions of processes in steps the same as those in the flowchart of FIG. 4 are omitted.

In step S901, the stroboscopic microcomputer 310 performs initialization and reading of a setting similarly to the process in step S401. Furthermore, the stroboscopic microcomputer 310 reads a setting of an initial value of a rotation angle and proceeds to step S902. The initial value of the rotation angle corresponds to a rotation angle of the movable portion 300b in which the irradiation direction of the light emission unit corresponds to a front direction (an angle in a vertical direction is 0 degree and an angle in a horizontal direction is 0 degree).

In step S902 to step S905, the stroboscopic microcomputer 310 performs a process the same as that from step S402 to step S405, and proceeds to step S906.

In step S906, the stroboscopic microcomputer 310 determines whether the set light emission mode is a semi-auto-bounce mode in which the semi-auto-bounce light emission photography is executable. When the semi-auto-bounce mode is detected, the process proceeds to step S907 whereas when a normal light emission mode in which the semi-auto-bounce light emission photography is not executable is detected, the process proceeds to step S916.

In step S907 and step S908, the stroboscopic microcomputer 310 performs the process in step S407 and step S408, and when an auto-bounce start button is turned on, the process proceeds to step S909, and otherwise, the process proceeds to step S910.

In step S909, the stroboscopic microcomputer 310 stores current detection results of bounce angle detection circuits 340a and 340c in the internal memory of the stroboscopic microcomputer 310 and proceeds to step S910.

In step S910, the stroboscopic microcomputer 310 determines whether information indicating that the switch SW1 of the camera body 100 is turned on has been transmitted to the stroboscopic microcomputer 310 through a communication line SC from the camera microcomputer 101. When the determination is affirmative, the process proceeds to step S911 whereas when the determination is negative, the process proceeds to step S912. Note that, in step S910, the stroboscopic microcomputer 310 may determine whether a signal of an instruction for executing the semi-auto-bounce has been transmitted to the stroboscopic microcomputer 310 through the communication line SC from the camera microcomputer 101. Furthermore, the signal of an instruction for executing the semi-auto-bounce may be transmitted from the camera microcomputer 101 when a first step of a release switch of the input unit 112 is operated (half press) or may be transmitted when an appropriate button other than the release switch of the input unit 112 is pressed.

In step S911, the stroboscopic microcomputer 310 calculates a driving amount for rotation of the movable portion 300b in accordance with the detection result stored in step S909 and current detection results of the bounce angle detection circuits 340a and 340c.

Furthermore, in a case where an orientation of the stroboscopic apparatus 300 is inclined at a time of the calculation of the driving amount, the driving amount is corrected in accordance with a detection result of the orientation detection circuit 360. The driving amount is corrected by, for example, detecting inclinations of axes of the orientation detection circuit 360 and calculating a correction driving amount which cancels the inclinations so that the calculated driving amount is obtained. Note that, when the semi-auto-bounce light emission photography is performed, unlike the first embodiment, a method for correcting a driving amount is not changed depending on an output of the back surface detection unit 316. Furthermore, a detection result of an orientation detection circuit 140 may be also used here instead of the detection result of the orientation detection circuit 360.

After the calculation of the driving amount, the calculated result is stored in the internal memory of the stroboscopic microcomputer 310, and the process proceeds to step S913.

In step S912, the stroboscopic microcomputer 310 determines whether a predetermined period of time has been elapsed while the switch SW1 of the camera body 100 is not turned on after the auto-bounce start button is turned on. When the determination is affirmative, the process proceeds to step S902 whereas when the determination is negative, the process returns to step S906.

In step S913, the stroboscopic microcomputer 310 rotates the movable portion 300b using the bounce circuit 340 in accordance with the calculation result of step S911. Thereafter, the process proceeds to step S914.

In step S914 to step S920, the stroboscopic microcomputer 310 performs a process the same as that from step S430 to step S436, and proceeds to step S902.

The process performed at a time of light emission of the stroboscopic apparatus 300 in the semi-auto-bounce light emission photography is thus executed.

As described above, in the semi-auto-bounce mode, unlike the auto-bounce mode, a threshold value for limiting a rotation available range of the movable portion 300b is not set irrespective of presence or absence of outputs of the back surface detection units 116 and 316. This is because an irradiation direction of the light emission unit in the semiauto-bounce mode is arbitrarily set by the user, and therefore, the user may easily move to a position where light emitted from the illumination apparatus is not incident on the user taking the irradiation direction of the light emission unit into consideration. Furthermore, since the user purposefully sets the irradiation direction, an intention of the user is preferably reflected as much as possible.

As described above, in the case where the irradiation direction of the light emission unit is automatically calculated, it is difficult for the user to recognize the irradiation direction of the light emission unit, and therefore, a setting of the bounce driving range at the time of the auto-bounce light emission photography is performed in accordance with the output of the back surface detection unit 316. However, in the case where the user sets the irradiation direction of the light emission unit, it is easy for the user to recognize the irradiation direction of the light emission unit, and therefore, a setting of the bounce driving range at the time of the semi-auto-bounce light emission photography is not performed in accordance with the output of the back surface detection unit 316. By this, the light from the illumination apparatus is prevented from being incident on the photographer (the user) while the intention of the user is reflected as much as possible.

Note that the flowcharts of this embodiment are merely examples, and the various processes may be executed by order different from the flowchart of this embodiment unless inconvenience is caused.

Third Embodiment

Hereinafter, a third embodiment of the present invention will be described with reference to FIG. 11. An imaging system of this embodiment is the same as those of the first and second embodiments, and therefore, descriptions of apparatuses included in the imaging system are omitted. In this embodiment, a case where an optical accessory fixed in a position on an irradiation direction side relative to a light emission surface of an optical panel, such as a color filter, a scattering panel, or a bounce adapter, disposed in front of an electric discharge tube 305 is used will be described. A stroboscopic apparatus 300 of this embodiment is different from those of the first and second embodiments in that a stroboscopic apparatus 300 of this embodiment includes an accessory detection unit 318 which is an accessory detector for detecting an optical accessory 400, such as a color filter, a scattering panel, or a bounce adapter. In this embodiment, a threshold value of a bounce driving range in auto-bounce light emission photography is changed in accordance with a detection result of the accessory detection unit 318.

Figure 11:
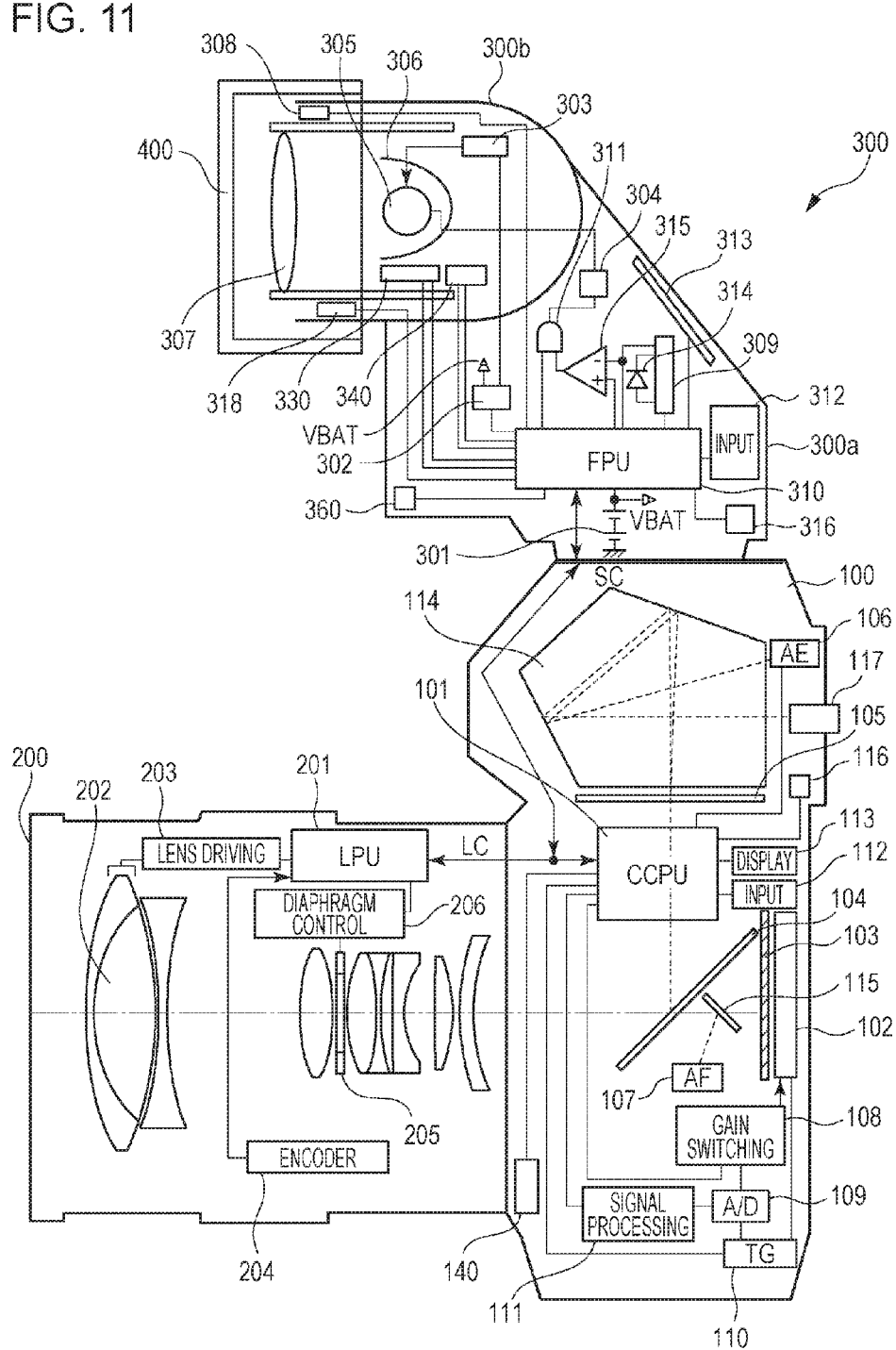
FIG. 11 is a block diagram schematically illustrating a configuration of an imaging system according to a third embodiment of the present invention.

FIG. 11 is a diagram schematically illustrating a configuration of the imaging system (including a camera body 100, a lens unit 200, the stroboscopic apparatus 300, and the optical accessory 400) according to the third embodiment. The accessory detection unit 318 is a circuit including a mechanical switch, a color detection sensor, an electrostatic sensor, and a magnetic sensor, and may distinguish and detect types of various optical accessories.

A process performed when the stroboscopic apparatus 300 emits light in the auto-bounce light emission photography in this embodiment is basically the same as the process illustrated in FIG. 4, and therefore, only a process different from the process described in the first embodiment is described hereinafter.

In step S401, as with the first embodiment, a stroboscopic microcomputer 310 performs initialization and reading of a setting. Furthermore, the stroboscopic microcomputer 310 determines whether the optical accessory 400 has been attached in accordance with a detection result of the accessory detection unit 318 and stores the detection result in an internal memory of the stroboscopic microcomputer 310. Thereafter, an initial setting of the threshold value of the bounce driving range is performed in accordance with a type of the attached optical accessory 400 based on the detection result of the accessory detection unit 318, and the process proceeds to step S402. The initial setting of the threshold value is performed as described below, for example. A color filter is used to control color temperature of stroboscopic light, and therefore, in a case where the accessory detection unit 318 detects a color filter of the stroboscopic apparatus 300, a threshold value which is set when the accessory detection unit 318 does not detect anything is set in the initial setting. Furthermore, a bounce adapter is used to enlarge an irradiation range of a light emission unit and emit scattering light in a subject direction and a ceiling direction, and therefore, the light emission unit is preferably prevented from emitting light in a direction of a photographer. Accordingly, in a case where the accessory detection unit 318 detects a bounce adapter, a value smaller than the threshold value which is set when the accessory detection unit 318 does not detect anything is set in the initial setting. The threshold value set here may be the same as or different from the second threshold value described in the first embodiment as long as the set threshold value is smaller than the first threshold value described in the first embodiment. Furthermore, in a case where the accessory detection unit 318 detects a plurality of optical accessories, a threshold value which restricts the bounce driving range at maximum among threshold values corresponding to the detected optical accessories is preferably set in the initial setting. For example, in a case where both a color filter and a bounce adapter are detected, a threshold value corresponding to the bounce adapter is preferably set in the initial setting.

A setting of a determination as to whether a process in step S413 to step S427 is to be omitted may be switched using an input unit 312 in accordance with a type of the optical accessory 400 detected by the accessory detection unit 318. For example, a bounce adapter has an advantage in that an effect of bounce light emission photography is easily obtained, and therefore, in a case where the accessory detection unit 318 detects a bounce adapter, a rotation angle of a movable portion 300b may be set to 90 degrees in an upper direction. Then the process from step S413 to step S427 may be omitted. In this case, 90 degrees is set as upper and lower limits of the threshold value of the bounce driving range in the initial setting.

In step S428, as with the first embodiment, the stroboscopic microcomputer 310 calculates a driving amount. However, in a case where the setting of omitting the process from step S413 to step S427 has been made, a driving amount of the movable portion 300b is calculated in accordance with the threshold value in the initial setting and detection results of bounce angle detection circuits 340a and 340c.

Thereafter, a process the same as the process of the first embodiment is performed, and after light emission is terminated, the process returns to step S402.

The process performed at a time of light emission of the stroboscopic apparatus 300 in the auto-bounce light emission photography is thus executed in accordance with a use state of the optical accessory 400.

On the other hand, in a case where semi-auto-bounce light emission photography is to be performed, a process is not changed depending on the use state of the optical accessory 400. Specifically, a process the same as that of the second embodiment is performed irrespective of the use state of the optical accessory 400. This is because, as described in the second embodiment, an intention of a user is reflected as much as possible in the semi-auto-bounce light emission photography.

Note that the flowcharts of this embodiment are merely examples, and the various processes may be executed in order different from the flowcharts of this embodiment unless inconvenience is caused.

As described above, in this embodiment, a limitation angle for limiting the rotation angle of the movable portion 300b in accordance with the use state of the optical accessory 400 is set so that light from an illumination apparatus is prevented from being incident on the photographer (the user) while the purpose of the user is reflected as much as possible.

Note that, in the three embodiments described above, a method for setting the limitation angle for limiting the rotation angle of the movable portion 300b is not limited. For example, the limitation angle may be set such that the relative positional relationship between a body portion 300a and the movable portion 300b is limited. In this case, an angle which allows the movable portion 300b to rotate in a horizontal direction relative to the body portion 300a and an angle which allows the movable portion 300b to rotate in a vertical direction relative to the body portion 300a are set as limitation angles. Alternatively, the limitation angle may be set using a direction of gravitational force as a reference. In this case, an angle in which an irradiation direction of the light emission unit directs the direction of gravitational force is set as the limitation angle.

Furthermore, although the case where the stroboscopic apparatus 300 sets the limitation angle for limiting the rotation angle of the movable portion 300b is described as an example in the three embodiments described above, at least a portion of the process executed by the stroboscopic apparatus 300 may be executed by the camera body 100. For example, the camera body 100 may set the limitation angle for limiting the rotation angle of the movable portion 300b in accordance with an output of a back surface detection unit 116 and transmit information on the limitation angle set to the stroboscopic apparatus 300.

Furthermore, although the semi-auto-bounce mode is not described in the first and third embodiments, the semi-auto-bounce mode may be provided in the first and third embodiments. Moreover, in a case where the semi-auto-bounce mode is provided in the first embodiment, the limitation angle may be set in accordance with an output of the back surface detection unit 316 while the same method for setting a limitation angle is used in the auto-bounce mode and the semi-auto-balance mode.

Fourth Embodiment

Figure 12:
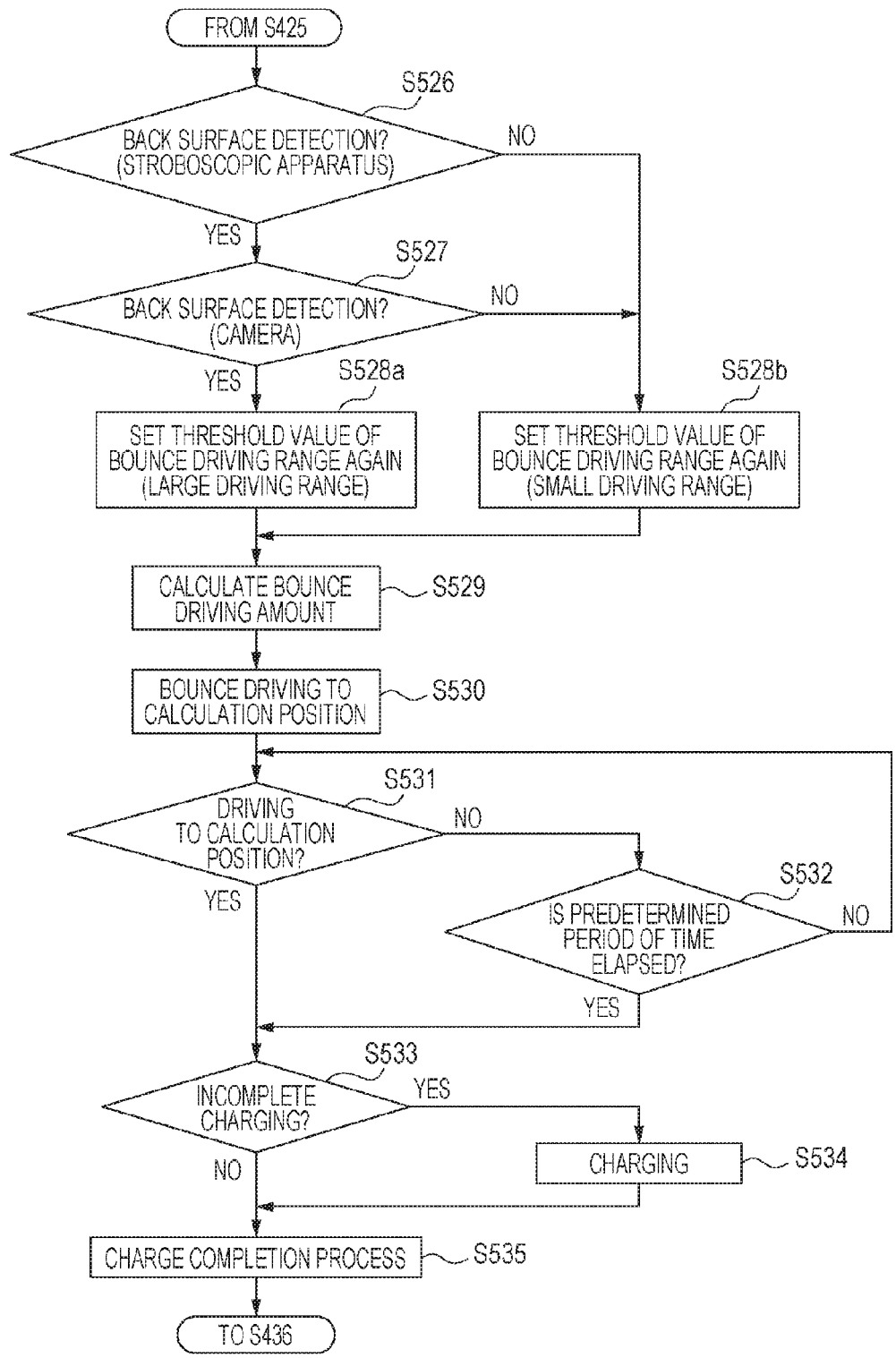
FIG. 12 is a flowchart illustrating various processes performed by a stroboscopic apparatus in auto-bounce light emission photography according to a fourth embodiment of the present invention.

A fourth embodiment is different from the first embodiment in a process of setting a threshold value of a bounce driving range. As with the first embodiment, an imaging system of this embodiment includes a camera body 100, a lens unit 200, and a stroboscopic apparatus 300. Hereinafter, a process different from that of the first embodiment will be described with reference to FIG. 12.

Figure 5:
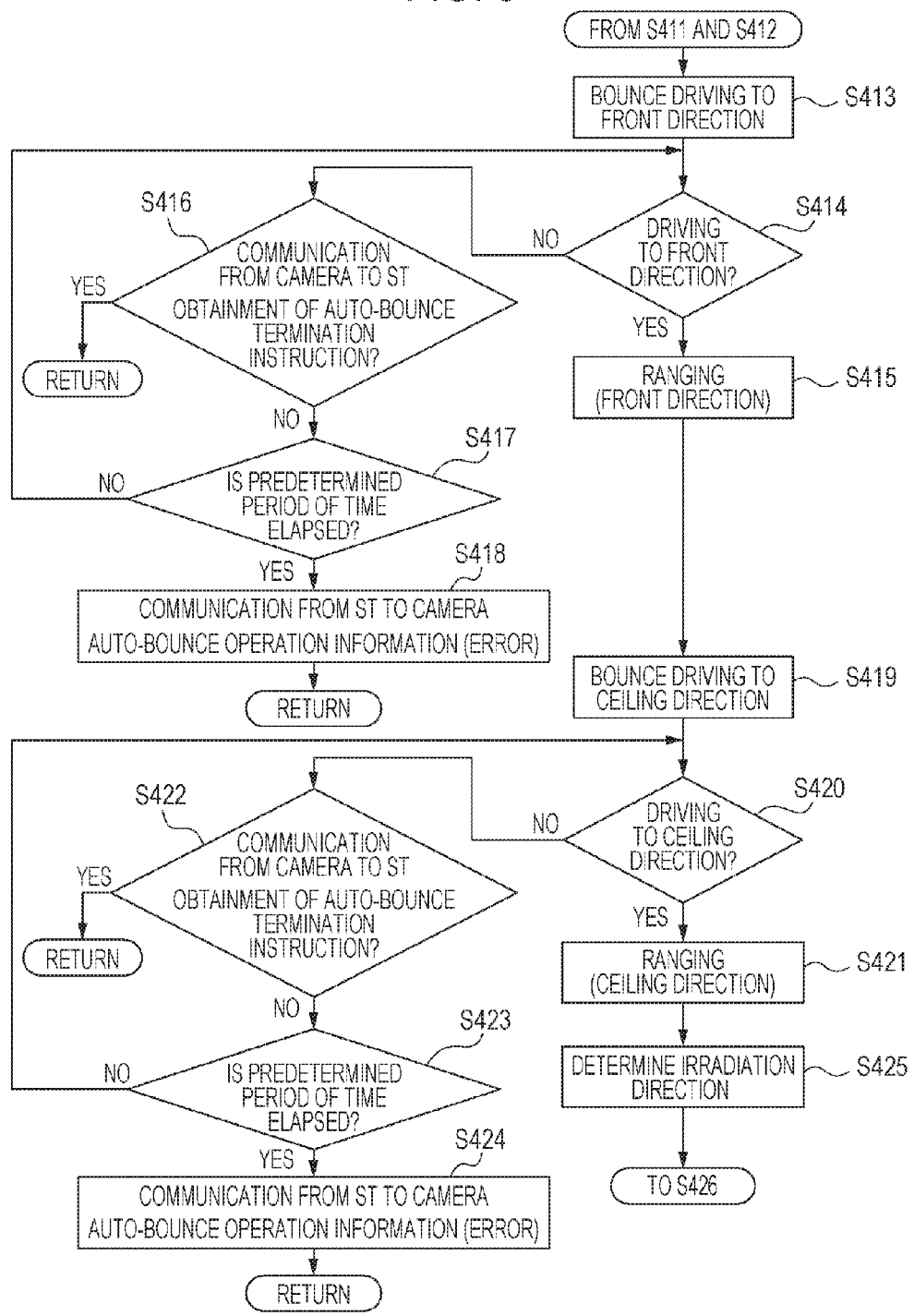
FIG. 5 is the flowchart illustrating the various processes performed by the stroboscopic apparatus in the auto-bounce light emission photography according to the first embodiment of the present invention.

After the process in step S425 of FIG. 5 is executed, the process proceeds to step S526.

In step S526, a stroboscopic microcomputer 310 determines whether a back surface detection unit 316 has detected an object. In a case where the back surface detection unit 316 has detected an object, information indicating that an object is detected is stored in an internal memory of the stroboscopic microcomputer 310, and the process proceeds to step S527. On the other hand, in a case where the back surface detection unit 316 has not detected an object, information indicating that an object is not detected is stored in the internal memory of the stroboscopic microcomputer 310, and the process proceeds to step S528b.

In step S527, the stroboscopic microcomputer 310 determines whether a back surface detection unit 116 has detected an object. Information on the back surface detection unit 116 obtained from a camera microcomputer 101 through a communication line SC is used for the determination. When the back surface detection unit 116 has detected an object, information indicating that the backside detection unit 116 has detected an object is stored in the internal memory of the stroboscopic microcomputer 310, and the process proceeds to step S528a. On the other hand, when the back surface detection unit 116 has not detected an object, information indicating that the back surface detection unit 116 has not detected an object is stored in the internal memory of the stroboscopic microcomputer 310, and the process proceeds to step S528b.

The back surface detection units 116 and 316 may perform the detection process such that the back surface detection units 116 and 316 constantly perform monitoring so as to determine whether an object exists in a detection range or may perform the detection process periodically. Furthermore, when an output from the back surface detection unit 316 to be used in step S526 and an output from the back surface detection unit 116 to be used in step S527 are obtained as latest as possible, differences between the outputs and actual states are small. Therefore, an output from the back surface detection unit 316 to be used in step S526 and an output from the back surface detection unit 116 to be used in step S527 are preferably obtained immediately before an auto-bounce start button is turned on or after the auto-bounce start button is turned on.

In step S528a, the stroboscopic microcomputer 310 performs resetting such that a first value is set to the threshold value of the bounce driving range. If the first value has already been set, this step may be omitted. After the resetting of the threshold value, the set threshold value is stored in the internal memory of the stroboscopic microcomputer 310, and the process proceeds to step S529.

In step S528b, the stroboscopic microcomputer 310 performs resetting such that a second value which is smaller than the first value is set to the threshold value of the bounce driving range. If the second value has already been set, this step may be omitted. After the resetting of the threshold value, the set threshold value is stored in the internal memory of the stroboscopic microcomputer 310, and the process proceeds to step S529.

In step S529, the stroboscopic microcomputer 310 calculates a driving amount for rotation of a movable portion 300b in accordance with a calculation result of step S425, detection results of bounce angle detection circuits 340a and 340c, and the threshold value set in step S528a or step S528b.

In this embodiment, unlike the first embodiment, the threshold value of the bounce driving range is set in accordance with an output of the back surface detection unit 116 and an output of the back surface detection unit 316. Since an output of the back surface detection unit 116 and an output of the back surface detection unit 316 are used, a determination as to whether a face of a photographer is positioned close to the camera body 100 may be accurately made, and light from an illumination apparatus is prevented from being incident on the user.

In a case where the back surface detection unit 116 has detected an object, it is highly likely that the face of the photographer is positioned close to the camera body 100. The back surface detection unit 316 detects an object when the face of the photographer is positioned close to the camera body 100 or when the photographer operates the input unit 312.

Accordingly, in this embodiment, in a case where the back surface detection unit 116 and the back surface detection unit 316 have detected an object, it is determined that the face of the photographer is positioned close to the camera body 100 and the first threshold value is set to the threshold value of the bounce driving range. Then, in a case where the back surface detection unit 116 has not detected an object but the back surface detection unit 316 has detected an object, it is determined that the face of the photographer is separated from the camera body 100 and the second threshold value is set to the threshold value of the bounce driving range.

Furthermore, a case where the back surface detection unit 116 has detected an object but the back surface detection unit 316 has not detected an object may occur. This case occurs when the movable portion 300b of the stroboscopic apparatus 300 is separated from the camera body 100. If the movable portion 300b of the stroboscopic apparatus 300 is separated from the camera body 100, light from the light emission unit may be incident on the face of the photographer even though the face of the photographer is positioned close to the camera body 100. Therefore, in the case where the back surface detection unit 116 has detected an object but the back surface detection unit 316 has not detected an object, a value smaller than the first value is preferably set as the threshold value of the bounce driving range. In this embodiment, in the case where the back surface detection unit 116 has detected an object but the back surface detection unit 316 has not detected an object, the second threshold value is set as the threshold value of the bounce driving range. Note that, in this embodiment, the second threshold value is set as the threshold value of the bounce driving range even in a case where the back surface detection units 116 and 316 have not detected an object, and accordingly, the second threshold value is set in a case where the back surface detection unit 316 has not detected an object. However, in the case where the backside detection unit 316 has not detected an object, different threshold values may be set for different results of a determination as to whether the back surface detection unit 116 has detected an object.

Figure 6:
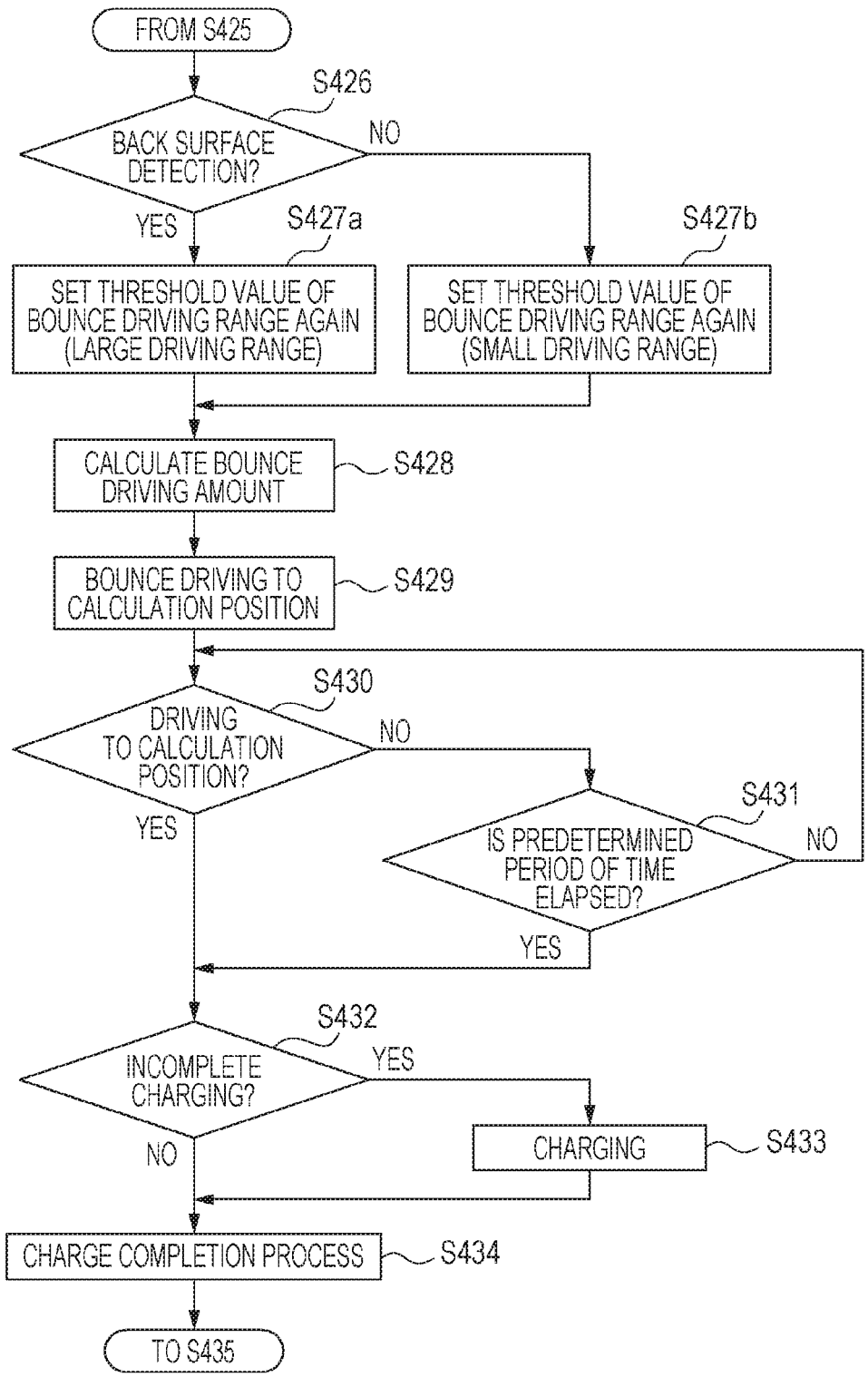
FIG. 6 is the flowchart illustrating the various processes performed by the stroboscopic apparatus in the auto-bounce light emission photography according to the first embodiment of the present invention.

A process from step S530 to step S535 is the same as that from step S429 to step S434 in FIG. 6, and therefore, a description thereof is omitted.

As described above, in this embodiment, the limitation angle of the bounce driving range is set in accordance with an output of the back surface detection unit 116 and an output of the back surface detection unit 316. Accordingly, the bounce light emission photography may be efficiently performed, and light from the illumination apparatus may be prevented from being incident on the user.

Furthermore, although the case where the stroboscopic apparatus 300 sets the limitation angle for limiting the rotation angle of the movable portion 300b is described as an example in the embodiment described above, at least a portion of the process executed by the stroboscopic apparatus 300 may be executed by a camera body 100. For example, a limitation angle for limiting the rotation angle of the movable portion 300b by the camera body 100 may be set in accordance with information on an output of the back surface detection unit 116 and an output of the back surface detection unit 316 received from the stroboscopic apparatus 300. Then the camera body 100 may transmit information on the set limitation angle to the stroboscopic apparatus 300.

Next, the back surface detection unit 316 in the four embodiments described above will be described in detail.

Figure 13:
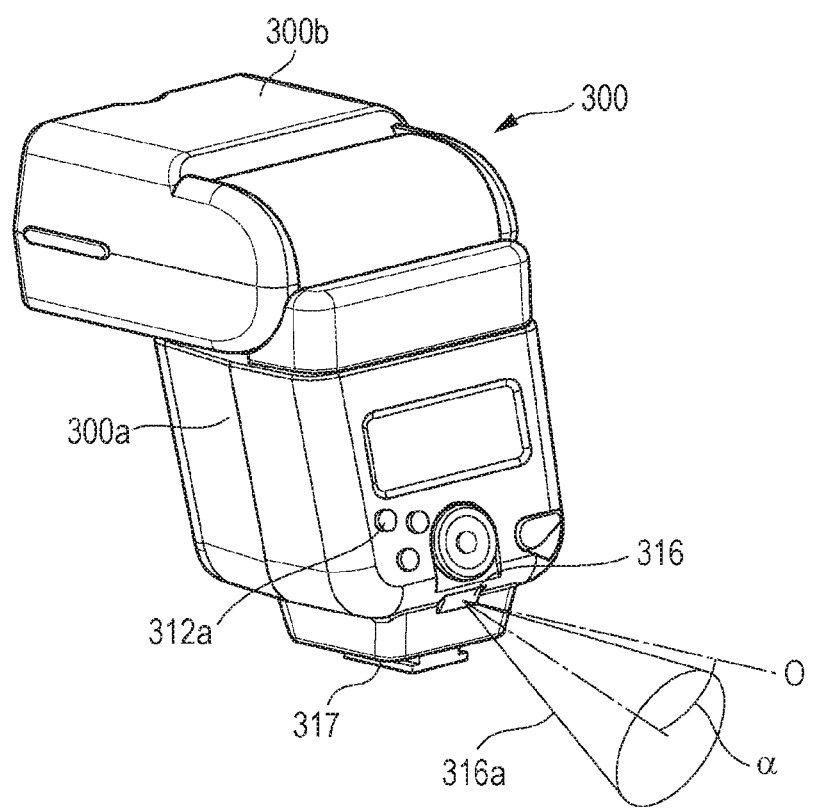
FIG. 13 is a diagram illustrating a detection range of a back surface detection unit.

As illustrated in FIG. 13, the back surface detection unit 316 has a detection range 316a which is a range in which a distance from a position of the back surface detection unit 316 in a predetermined direction is smaller than a predetermined value. However, if the detection range is too large, the face of the user is detected even in a state in which the face of the user is separated from the finder 117 of the camera body 100, and therefore, it is preferable that the detection range 316a is approximately 10 cm at maximum from the position of the back surface detection unit 316, for example. Furthermore, a center of the detection range 316a is inclined downward relative to a back surface of a body portion 300a. Specifically, the center of the detection range 316a is set so as to be inclined downward by an angle α relative to an axis O which is parallel to a center axis of light emitted from the light emission unit and which passes the back surface detection unit 316 in a state in which the movable portion 300b is in a reference position relative to the body portion 300a.

Since the detection range 316a is inclined downward as described above, the user easily enters in the detection range when the user looks into a finder 117 of the camera body 100. Note that the inclination angle α of the detection range 316a is preferably set to be an angle equal to or larger than 5 degrees and equal to or smaller than 45 degrees taking the detection range 316a and a distance from the camera body 100 to the back surface detection unit 316 into consideration. By this, the user may be reliably detected when the user is looking into the finder 117 of the camera body 100 irrespective of a posture of the user holding the camera body 100 (an orientation of the stroboscopic apparatus 300).

Figure 14A:
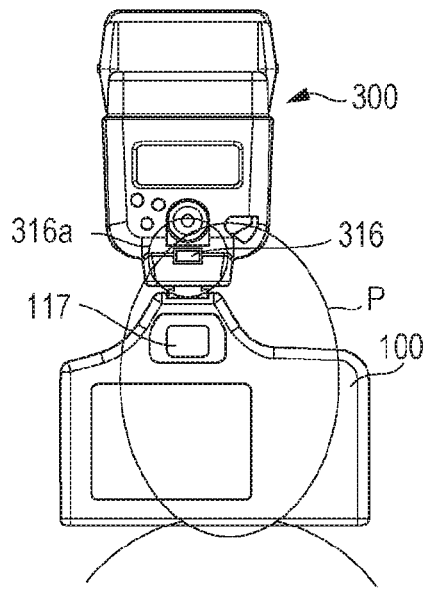
FIGS. 14A to 14D are diagrams illustrating the relationships between the stroboscopic apparatus and the detection range of the back surface detection unit.
Figure 14B:
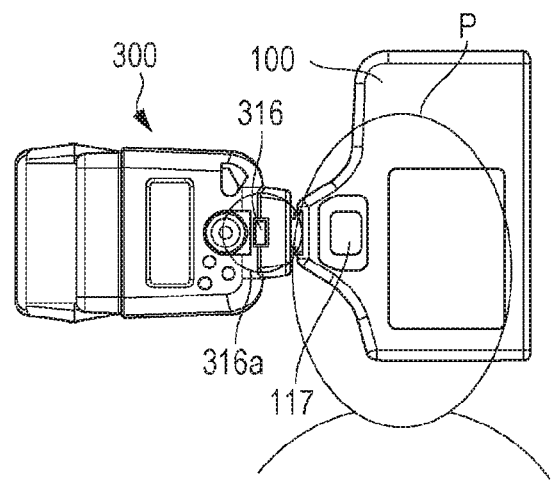
Figure 14C:
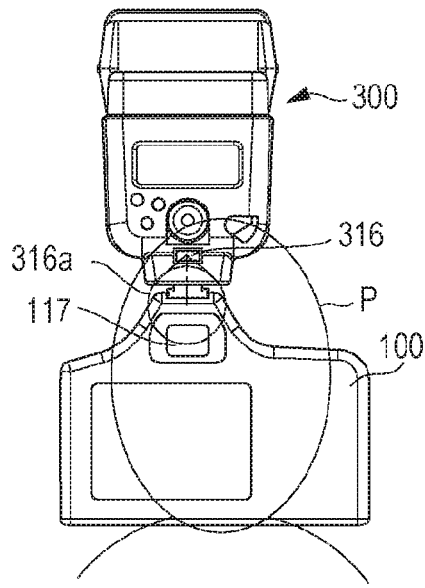
Figure 14D:
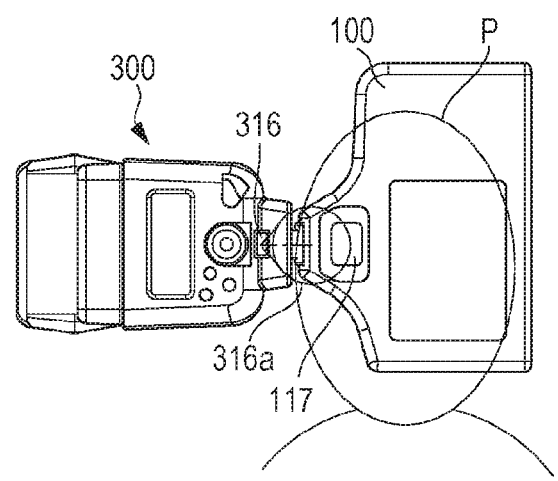

Next, the relationship between the orientation of the stroboscopic apparatus 300 and the detection range 316a of the back surface detection unit 316 will be described with reference to FIGS. 14A to 14D. FIG. 14A is a diagram illustrating the positional relationship between the detection range 316a and the user in a state in which the detection range 316a is not inclined and a vertical direction of the camera body 100 is parallel to a direction of gravitational force. FIG. 14B is a diagram illustrating the positional relationship between the detection range 316a and the user in a state in which the detection range 316a is not inclined and the vertical direction of the camera body 100 is orthogonal to the direction of gravitational force. FIG. 14C is a diagram illustrating the positional relationship between the detection range 316a and the user in a state in which the detection range 316a is inclined and the vertical direction of the camera body 100 is parallel to the direction of gravitational force. FIG. 14D is a diagram illustrating the positional relationship between the detection range 316a and the user in a state in which the detection range 316a is inclined and the vertical direction of the camera body 100 is orthogonal to the direction of gravitational force. Hereinafter, an orientation of the camera body 100 in the state in which the vertical direction thereof is parallel to the direction of gravitational force is referred to as a "normal position", and an orientation of the camera body 100 in the state in which the vertical direction thereof is orthogonal to the direction of gravitational force is referred to as a "vertical position".

As illustrated in FIG. 14A, in the normal position, when a user P looks into the finder 117, the user P enters the detection range 316a, and therefore, the user P positioned near the stroboscopic apparatus 300 may be detected. As illustrated in FIG. 14B, in the vertical position, when the user P looks into the finder 117, the user P shifts from a center of the detection range 316a, and therefore, the user P positioned near the stroboscopic apparatus 300 may not be detected.

On the other hand, in a case where the detection range 316a is inclined downward, the user P enters the center of the detection range 316a when the user P looks into the finder 117 in both of the normal direction and the vertical direction as illustrated in FIGS. 14C and 14D. Therefore, the user P positioned near the stroboscopic apparatus 300 may be reliably detected.

Next, a user's operation performed on the stroboscopic apparatus 300 will be described with reference to FIGS. 15A and 15B.

As described above, the various operation members including an auto-bounce start button 312a and a display member are provided on a back surface of the stroboscopic apparatus 300.

Therefore, if a hand of the user enters the detection range 316a when the user operates the auto-bounce start button 312a, a finder photographing state in which the user looks into the finder 117 is mistakenly detected instead even in a live-view photographing state. Accordingly, as illustrated in FIGS. 15A and 15B, the auto-bounce start button 312a is preferably disposed in a position where the hand of the user hardly enters the detection range 316a when the user operates the auto-bounce start button 312a.

Figure 15A:
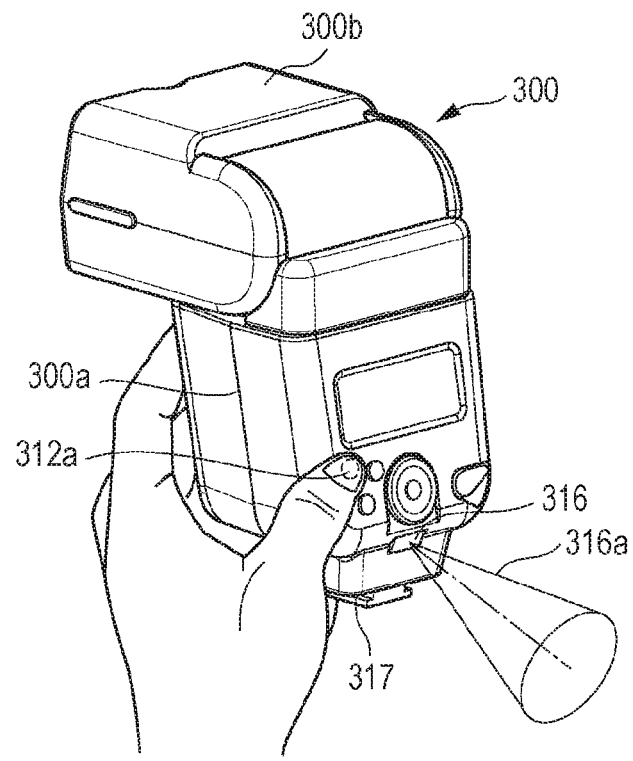
FIGS. 15A and 15B are diagrams illustrating user's operations performed on the stroboscopic apparatus.

In FIG. 15A, the auto-bounce start button 312a is disposed in a position which is included in the back surface of the stroboscopic apparatus 300 and which is separated from the back surface detection unit 316 in an upper left direction viewed from the user. By this, the user may easily operate the auto-bounce start button 312a by a left hand in a state in which the hand does not enter the detection range 316a while the user grasps a grip portion disposed near a right side surface of the camera body 100 with a right hand.

Figure 15B:
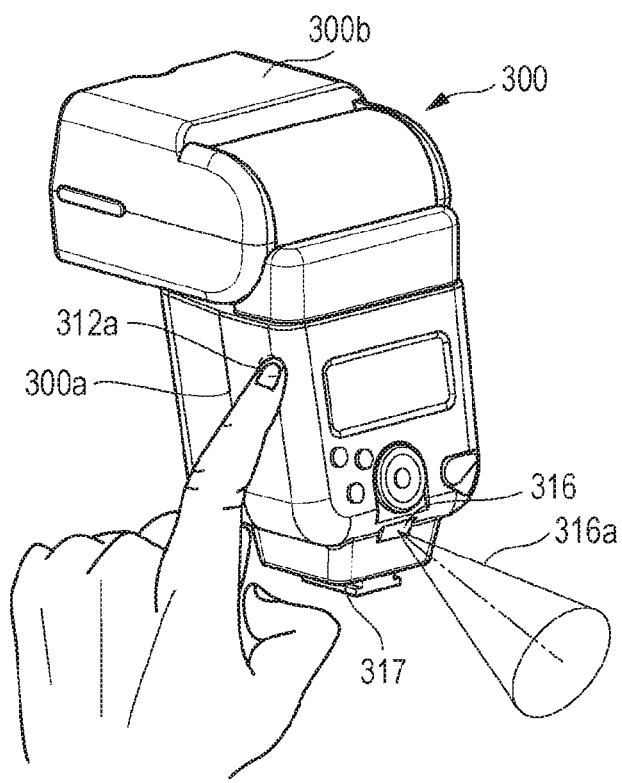

Furthermore, in FIG. 15B, the auto-bounce start button 312a is dispose on a left side surface of the body portion 300a. Also in the position illustrated in FIG. 15B, as with the position illustrated in FIG. 15A, the user may easily operate the auto-bounce start button 312a by the left hand in a state in which the hand does not enter the detection range 316a while the user grasps the grip portion disposed near the right side surface of the camera body 100 with the right hand. Specifically, the back surface detection unit 316 is disposed in a position on a right side relative to a position of the auto-bounce start button 312a in the body portion 300a viewed from a side of the back surface detection unit 316 in the body portion 300a. Furthermore, the back surface detection unit 316 is disposed in a position on a lower side relative to the position of the auto-bounce start button 312a in the body portion 300a viewed from the side of the back surface detection unit 316 in the body portion 300a.

Note that, although the example of the position of the input unit 312 is described in this embodiment, if an operation member corresponding to an operation controlled based on a detection result of the backside detection unit 316 is similarly positioned, malfunction may be prevented.

Next, other examples of a position of the back surface detection unit 316 will be described with reference to FIGS. 16 and 17.

Figure 16:
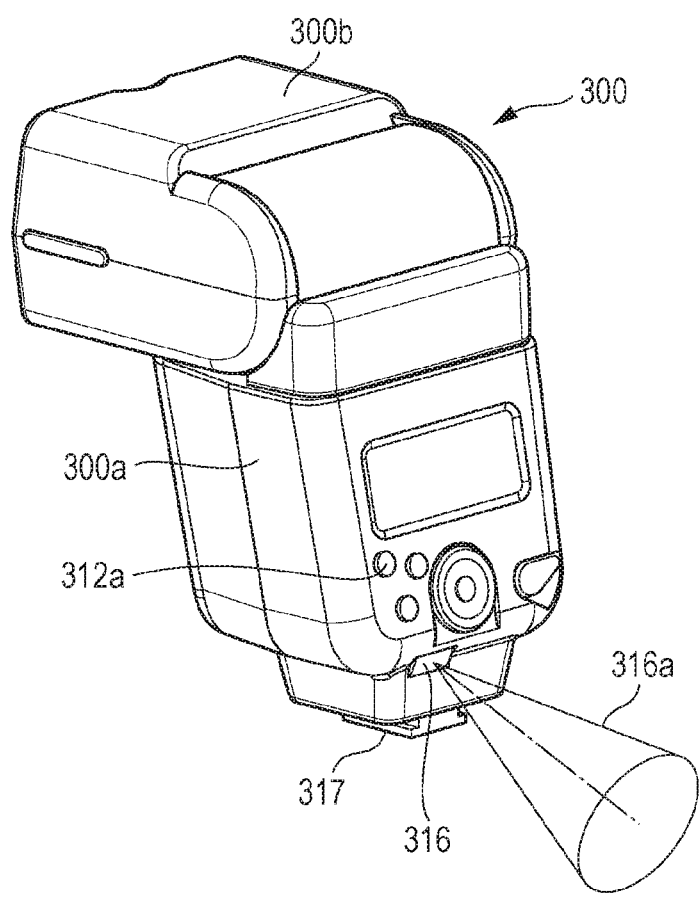
FIG. 16 is a diagram illustrating a position of the back surface detection unit in the stroboscopic apparatus.

In the example of a position illustrated in FIG. 16, the back surface detection unit 316 is disposed in a position which is included in the back surface of the body portion 300a, which is near an upper side of the connection unit 317, and which is shifted leftward from a center of the back surface of the body portion 300a by a certain distance when viewed from the user.

If the detection range 316a of the back surface detection unit 316 is sufficient to detect the user P, the back surface detection unit 316 may be disposed in a position shifted in a horizontal direction as illustrated in FIG. 16. In this way, since the back surface detection unit 316 has the degree of freedom of a position, the back surface detection unit 316 may be disposed in a position advantageous in downsizing of the stroboscopic apparatus 300.

Furthermore, although the back surface detection unit 316 is disposed in a position shifted leftward from the center of the back surface by a certain distance in the example of a position in FIG. 16, the back surface detection unit 316 may be disposed in a position shifted rightward from the center of the back surface by a certain distance.

Furthermore, a position of the back surface detection unit 316 may be determined taking design of a camera to which the stroboscopic apparatus 300 is attached into consideration. In a case where an accessory shoe of the camera is shifted leftward relative to a photographing optical axis when viewed from a back surface side of the camera, for example, a position of a stroboscopic apparatus attached to the accessory shoe of the camera is also shifted leftward relative to the photographing optical axis. A shift between a position of the face of the user and the photographing optical axis is small when the user looks into a finder of the camera having such a configuration with a left eye rather than a right eye, and therefore, the user easily holds the camera. Accordingly, assuming that the back surface detection unit 316 is disposed in the camera having such a configuration, the user may be reliably detected when the back surface detection unit 316 is disposed in a position shifted rightward from the center of the back surface when compared with a case where the back surface detection unit 316 is disposed in a position shifted leftward from the center of the back surface. Alternatively, in a case where it is assumed that the back surface detection unit 316 is attached to a camera in which a position of an accessory shoe and a position of a finder are shifted from each other when viewed from a back surface, a position of the back surface detection unit 316 may be determined taking the relationship between the position of the accessory shoe and the position of the finder into consideration. The user who is looking into the finder is more likely to be detected in the detection range 316a of the back surface detection unit 316 when the back surface detection unit 316 is disposed in a position shifted toward the finder relative to the center of the back surface when the back surface detection unit 316 is disposed in the accessory shoe.

As described above, the position of the back surface detection unit 316 is not limited to the center of the back surface of the body portion 300a in the horizontal direction.

Figure 17:
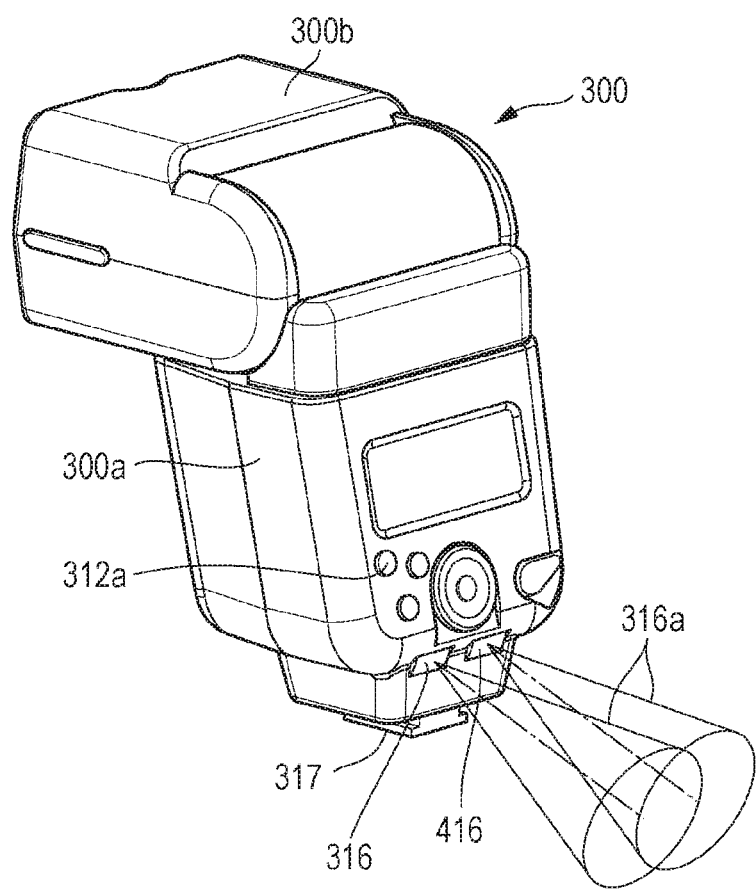
FIG. 17 is a diagram illustrating a position of the back surface detection unit in the stroboscopic apparatus.

In an example of a position illustrated in FIG. 17, the back surface detection unit 316 and a back surface detection unit 416 are disposed in positions which are included in the back surface of the body portion 300a and which are near the upper side of the connection unit 317 so as to sandwich the center of the back surface.

In a case where a plurality of back surface detection units are provided as illustrated in the example of the position in FIG. 17, a large detection available range is obtained, and the user who is looking into the finder may be reliably detected. Note that three or more back surface detection units may be disposed.

Although the preferred embodiments of the present invention are described hereinabove, the present invention is not limited to the embodiments and various modifications and changes may be made within the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-095237, filed May 7, 2015, Japanese Patent Application No. 2015-095238, filed May 7, 2015, and Japanese Patent Application No. 2015-095239, filed May 7, 2015, which are hereby incorporated by reference herein in their entirety.

What is claimed is:

1. An illumination apparatus comprising:
a first case detachably attached to an imaging apparatus;
a second case rotatable relative to the first case;
a light emission unit disposed on the second case;
a driving unit configured to rotate the second case relative to the first case;
a sensor configured to output information on presence or absence of an object in a certain range; and
a setting unit configured to set a limitation angle for rotation of the second case rotated by the driving unit relative to the first case,
wherein the sensor is disposed in a back surface of the first case, and
the setting unit sets a smaller limitation angle when the information output from the sensor indicates that an object does not exist in the certain range when compared with a case where the information indicates that an object exists in the certain range.

2. The illumination apparatus according to claim 1, further comprising:
a first obtaining unit configured to obtain first information on a distance to a subject;
a second obtaining unit configured to obtain second information on a distance to an object positioned in a direction different from a direction of the subject; and
a calculation unit configured to calculate an irradiation direction of the light emission unit based on the first information and the second information,
wherein the driving unit rotates the second case in a range of an angle equal to or smaller than the limitation angle set by the setting unit in accordance with the irradiation direction calculated by the calculation unit.

3. The illumination apparatus according to claim 2,
wherein, in a case where a rotation angle of the second case corresponding the irradiation direction calculated by the calculation unit exceeds the limitation angle, the driving unit drives the second case such that the rotation angle of the second case matches the limitation angle.

4. The illumination apparatus according to claim 1,
wherein the back surface of the first case is opposite to a surface of the first case positioned on a subject side when the first case is attached to the imaging apparatus.

5. The illumination apparatus according to claim 1,
wherein an optical accessory is attachable in front of the light emission unit in the illumination apparatus, and
the setting unit changes the limitation angle depending on a type of the optical accessory attached in front of the light emission unit.

6. The illumination apparatus according to claim 1,
wherein an optical accessory is attachable in front of the light emission unit in the illumination apparatus, and
the setting unit changes the limitation angle depending on a result of a determination as to whether the optical accessory has been attached.

7. The illumination apparatus according to claim 1,
wherein, in a case where the attached imaging apparatus includes a second sensor which outputs information on presence or absence of an object in a certain range, the setting unit sets the limitation angle based on information output from the sensor and information output from the second sensor.

8. The illumination apparatus according to claim 7,
wherein the setting unit sets a smaller limitation angle when the information output from the sensor indicates that an object exists in the certain range and the information output from the second sensor indicates that an object does not exist in the certain range when compared with a case where the information output from the sensor indicates that an object exists in the certain range and the information output from the second sensor indicates that an object exists in the certain range.

9. The illumination apparatus according to claim 7,
wherein the setting unit sets a smaller limitation angle when the information output from the sensor indicates that an object does not exist in the certain range and the information output from the second sensor indicates that an object does not exist in the certain range when compared with a case where the information output from the sensor indicates that an object exists in the certain range and the information output from the second sensor indicates that an object exists in the certain range.

10. An illumination apparatus comprising:
a first case detachably attached to an imaging apparatus;
a second case rotatable relative to the first case;
a light emission unit disposed on the second case;
a driving unit configured to rotate the second case relative to the first case; and
a sensor configured to output information on presence or absence of an object in a certain range,
wherein the information output from the sensor is used to change a rotation range of the second case rotated by the driving unit, and
the sensor is disposed on a back surface of the first case.

11. The illumination apparatus according to claim 10, further comprising:
a connection unit disposed on a lower surface of the first case and configured to attach the first case to the imaging apparatus,
wherein the sensor is disposed such that the sensor directs a lower side relative to a direction orthogonal to the back surface.

12. The illumination apparatus according to claim 10, further comprising:
an operation unit configured to instruct the driving unit to rotate the second case,
wherein the sensor is disposed in a position lower than a position of the operation unit.

13. The illumination apparatus according to claim 11,
wherein the sensor is disposed in a position on a right side of the position of the operation unit when viewed from the back surface of the first case.

14. The illumination apparatus according to claim 10,
wherein the sensor is disposed in a center of a horizontal direction of the first case when viewed from the back surface of the first case.

15. The illumination apparatus according to claim 10,
wherein the sensor is disposed in a position shifted leftward or rightward relative to a center in the horizontal direction of the first case when viewed from the back surface of the first case.

16. An imaging apparatus to which an illumination apparatus including a first case attachable to the imaging apparatus, a second case rotatable relative to the first case, a light emission unit disposed on the second case, and a driving unit which rotates the second case relative to the first case is attachable, the imaging apparatus comprising:
a finder;
a sensor configured to output information on presence or absence of an object in a certain range; and
a setting unit configured to set a limitation angle for rotation of the second case rotated by the driving unit relative to the first case in accordance with the information output from the sensor,
wherein the sensor is disposed near the finder, and
the setting unit sets a small limitation angle when the information output from the sensor indicates that an object does not exist in the certain range when compared with a case where the information output from the sensor indicates that an object exists in the certain range.

* * * * *